(12) United States Patent
Miyazaki et al.

(10) Patent No.: US 7,377,342 B2
(45) Date of Patent: May 27, 2008

(54) TRANSMISSION FOR FOUR-WHEEL DRIVE VEHICLE AND FOUR-WHEEL DRIVE VEHICLE

(75) Inventors: Takeshi Miyazaki, Miki (JP); Hiroyuki Fujimoto, Akashi (JP); Izumi Takagi, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 378 days.

(21) Appl. No.: 11/209,622

(22) Filed: Aug. 24, 2005

(65) Prior Publication Data

US 2006/0058148 A1   Mar. 16, 2006

(30) Foreign Application Priority Data

Sep. 15, 2004   (JP)   ............................. P2004-268683

(51) Int. Cl.
*B60K 17/24* (2006.01)

(52) U.S. Cl. ........................................ 180/62; 180/233

(58) Field of Classification Search .................. 180/56, 180/57, 62, 233, 247
See application file for complete search history.

(56) References Cited

U.S. PATENT DOCUMENTS 4,664,208 A * 5/1987 Horiuchi et al. ............... 180/23
6,935,453 B2 * 8/2005 Mizuta et al. ............... 180/235

FOREIGN PATENT DOCUMENTS

JP            2694202        9/1997
JP       2002-227939        8/2002

* cited by examiner

*Primary Examiner*—Kevin Hurley
(74) *Attorney, Agent, or Firm*—Wenderoth, Lind & Ponack, L.L.P.

(57) ABSTRACT

Disclosed is a mechanism of a four-wheel drive vehicle, for enabling an engine and a transmission to be arranged compact by using an empty space within a body frame of the vehicle. The transmission includes a power take-off part for driving front wheels of the vehicle, and a rear reduction gear mechanism for driving rear wheels of the vehicle. The transmission and the engine are mounted on a swing arm which is supported on the body frame of the vehicle so as to be able to swing in an up and down direction.

5 Claims, 18 Drawing Sheets

TRANSMISSION FOR FOUR-WHEEL DRIVE VEHICLE AND FOUR-WHEEL DRIVE VEHICLE

BACKGROUND OF THE INVENTION

1. Field of the Invention

The present invention generally relates to a transmission for a four-wheel drive vehicle and a four-wheel drive vehicle having the transmission, and particularly relates to the transmission suitable for the four-wheel drive vehicle having a swing arm for rear wheels, such as an all-terrain vehicle (A.T.V.), an utility vehicle for transport of articles, and the like, which is suitable for traveling on rough road.

2. Description of the Related Art

Conventionally, a four-wheel drive vehicle having rear wheels supported by a swing arm system for traveling on rough road, has been widely prevalent. In such a four-wheel drive vehicle having the swing arm system, the engine and the transmission have conventionally been mounted on a body frame of the vehicle. And in such a conventional four-wheel drive vehicle, the transmission on the body frame and a front reduction gear mechanism built in a front reduction gear case provided between two front wheels, are connected to each other through a front propeller shaft for driving the front wheels, and the transmission and a rear reduction gear mechanism built in a rear reduction gear case mounted on the swing arm are connected to each other through a rear propeller shaft for driving the rear wheels.

For example, as related arts, the four-wheel vehicle with the swing arm system in which the rear wheels are driven, has been conventionally known, as disclosed in Japanese Patent No. 2694202. Also, as the transmission for the four-wheel drive vehicle where the transmission is mounted on the body frame of the vehicle, a power takeoff shaft of the transmission, extending in the direction of the front and rear of the vehicle, being mounted on one side of the transmission, or under the transmission, in which the front part of the power takeoff shaft is connected to the front propeller shaft for driving the front wheels, and in which the rear part of the power takeoff shaft is connected to the rear propeller shaft for driving the rear wheels, has been disclosed in Japanese Laid-Open Patent Publication No. 2002-227939.

According to the four-wheel drive vehicle in which the rear axle shaft is supported by the swing arm system and in which the engine and the transmission are mounted on the body frame, the location of the engine and the transmission is necessarily somewhere in a front half of the vehicle, for example, under the seat. With the location, the vibration from the engine is easily transmitted to the driver, the space around the driver becomes smaller, and therefore the amenity of riding the vehicle is lowered.

Also, the rear propeller shaft which connects the transmission on the body frame to the rear reduction gear mechanism on the swing arm, is mounted so as to be able to swing up and down along with the swing of the swing arm. Therefore, compared with the front propeller shaft, the loss of power in transmission by the rear propeller shaft for driving the rear wheels becomes greater than that of the former. Namely, if the vehicle is an utility vehicle for transport of articles, which is loaded with heavy goods at the rear part for example, the load which the rear wheels receive becomes greater. Therefore, the economical efficiency in view of its fuel consumption becomes lower.

SUMMARY OF THE INVENTION

Therefore, it is an object of the present invention to provide a transmission for a four-wheel drive vehicle with a swing arm system for rear wheels of the vehicle in which the aforementioned technical problem is solved, and in which the transmission and a rear reduction gear mechanism for the rear wheels are reduced in size and weight by devising the construction of the transmission.

In accomplishing this and other objects of the present invention, there is provided a transmission of a four-wheel drive vehicle having a swing arm for supporting rear wheels of the vehicle, the swing arm being supported on a vehicle body so as to be able to swing in an up and down direction, the transmission comprising: a transmission case having a power takeoff shaft case; an input shaft housed in the transmission case; a counter shaft housed in the transmission case, in which the counter shaft is in parallel with the input shaft and is connected with the input shaft through a gear mechanism; a transmission output shaft housed in the transmission case, in which the transmission output shaft is in parallel with the counter shaft and is connected with the counter shaft through a gear mechanism; a power takeoff shaft for driving front wheels of the vehicle, in which the power takeoff shaft is housed in the power takeoff shaft case and is connected with the transmission output shaft through a bevel gear mechanism, and in which the power takeoff shaft extends in a direction substantially perpendicular to the transmission output shaft; a rear reduction gear mechanism housed in the transmission case, in which the rear reduction gear mechanism is connected with the transmission output shaft through a gear mechanism; and a rear axle shaft for driving the rear wheels, in which the rear axle shaft is housed in the transmission case and is supported on the transmission case at one end thereof, and in which the rear axle shaft is connected to the rear reduction gear mechanism, wherein the transmission is mounted on the swing arm of the vehicle.

According to the mechanism, since the transmission having the power takeoff shaft for driving front wheels and the rear reduction gear mechanism for rear wheels are mounted on the swing arm, a space in a rear half part of the vehicle, for example an underside space of a rear deck (load carrying platform) of a utility vehicle for transport of articles can be effectively employed for arranging the transmission of the vehicle. Therefore, with the mechanism, it is possible to make the vehicle compact, and to secure a wide space around a driver's seat and around a manual operation device of the vehicle, so that a comfortable ride to the driver can be surely realized.

Also, since the transmission with the rear axle shaft is mounted on the swing arm, the relative location between the transmission and the rear axle shaft for the rear wheels does not change. Therefore, the loss of driving power to the rear axle shaft is effectively reduced, and the economical efficiency relating to fuel consumption is surely enhanced. Particularly, the mechanism is suitable for vehicles such as utility vehicles for transport of articles, in which a large amount of load is exerted upon the rear wheels.

Also, according to the mechanism, since the rear reduction gear mechanism is provided in the transmission case and is connected to the transmission output shaft through the gear mechanism, the rear reduction gear mechanism can be set at arbitrary (or optional) location in the direction of width of the vehicle. Thereby, the transmission with the rear reduction gear mechanism can be reduced in size and weight.

Preferably, the input shaft, the counter shaft and the transmission output shaft are arranged from top down in this order, and the rear reduction gear mechanism and the rear axle shaft are arranged on a rear side of the transmission output shaft.

With the mechanism, it is possible to make the transmission compact and suitable for mounting on the swing arm.

In the above mechanism, the power takeoff shaft for driving the front wheels can be provided with a drive selector mechanism for changing drive modes between a two-wheel drive and a four-wheel drive, by which a driving power from the transmission output shaft to the front wheels is on and off.

Preferably, the drive selector mechanism may have a driven bevel gear constituting the bevel gear mechanism, in which the driven bevel gear is relatively rotatably mounted on the power takeoff shaft, in which the driven bevel gear is provided with a dog claw projecting from a side of the driven bevel gear in an axial direction of the power takeoff shaft, in which the drive selector mechanism may have a selector sleeve which spline-engages with the power takeoff shaft such that the selector sleeve can slide on the power takeoff shaft in the axial direction, in which the selector sleeve has a dog claw which is opposed to the dog claw of the driven bevel gear and which can engage and disengage with respect to the dog claw of the driven bevel gear, and in which when the selector sleeve is slid on the power takeoff shaft in the axial direction, the dog claw of the selector sleeve is engaged and disengaged with respect to the dog claw of the driven bevel gear, thus changing the drive modes between the two-wheel drive and the four-wheel drive. In this structure, the drive selector mechanism can be compactly provided in the transmission.

In the above mechanism, preferably, the power takeoff shaft case is composed of a pair of half case parts which are divided by a mating face passing through an axis of the power takeoff shaft, in which one of the half case parts is integrally formed with the transmission case.

According to the mechanism, for example, if comparing with the power takeoff shaft case, all of which is formed independently from the transmission case and is attached to the transmission case, there is no need of forming a bracket, etc. for attaching the power takeoff shaft case to the transmission case. Therefore, it is possible to make the amount of projection from the transmission case smaller. Namely, with the mechanism, the downsizing of the transmission case accommodating the power takeoff shaft is realized.

According to the present invention, there is also provided a four-wheel drive vehicle comprising: a vehicle body; a swing arm for supporting rear wheels of the vehicle, in which the swing arm is supported on the vehicle body so as to be able to swing in an up and down direction; an engine for the vehicle; and a transmission for transmitting a power of the engine to the rear wheels which are supported on the swing arm and to front wheels which are supported on the vehicle body, wherein the engine and the transmission are mounted on the swing arm.

BRIEF DESCRIPTION OF THE DRAWINGS

This and other objects and features of the present invention will become clear from the following description taken in conjunction with a preferred embodiment thereof with reference to the accompanying drawings.

DETAILED DESCRIPTION OF THE PREFERRED EMBODIMENT

Figure 1:
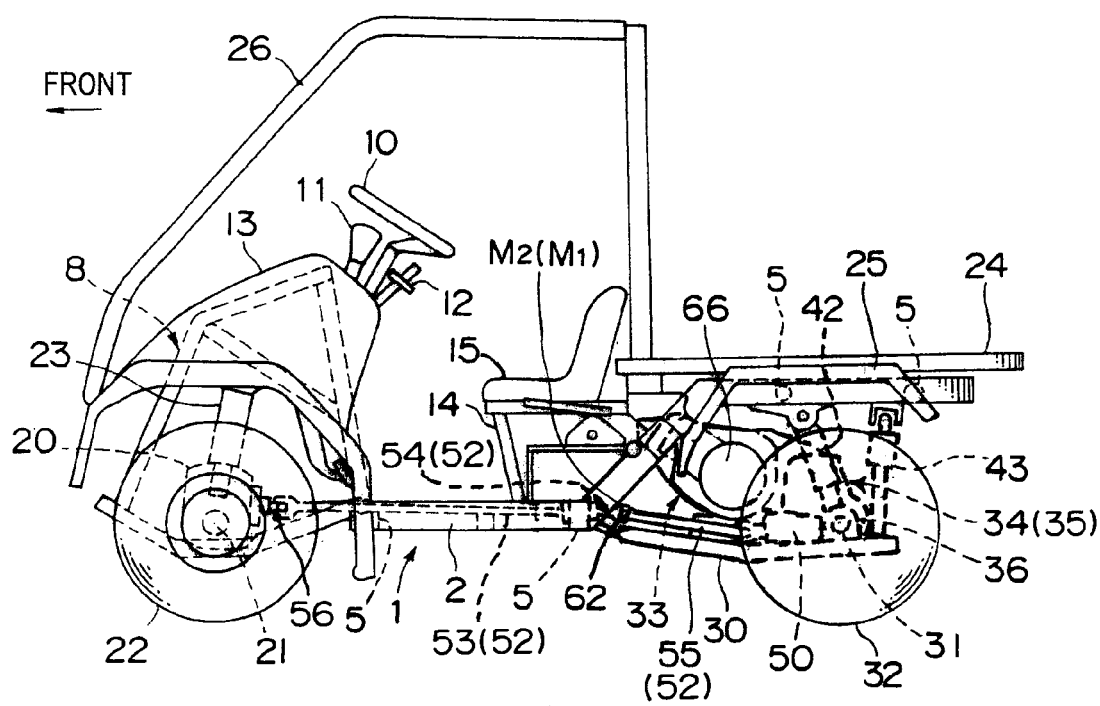
FIG. 1 is a left side view of a four-wheel drive vehicle to which a transmission according to a preferred embodiment of the present invention applies.

Before a description of the preferred embodiment of the present invention proceeds, it is to be noted that like or corresponding parts are designated by like reference numerals throughout the accompanying drawings.

Referring to FIGS. 1 through 18, the description is made below upon a transmission according to the preferred embodiment of the present invention, which applies to a four-wheel drive utility vehicle for transport of articles, and referring to FIGS. 19 through 21, the description is made below upon a transmission according to a modification to the embodiment, which applies to a two-wheel drive vehicle.

First, with reference to FIGS. 1 through 18, it is explained about the transmission according to the preferred embodiment of the present invention, which applies to the four-wheel drive utility vehicle (hereinafter, referred to as "four-wheel drive vehicle").

FIG. 1 shows a left side of the four-wheel drive vehicle, with respect to a direction in which the vehicle moves forward (hereinafter, referred to as. "forward direction"). A body frame (i.e. vehicle body) 1 has a pair of right and left main pipes 2 formed with cornered pipes, each of which extends in a direction of the front and rear of the body frame 1 (hereinafter, referred to as "back-and-forth direction"), as main frames. The pair of right and left main pipes 2 are integrally fixed to each other by a plurality of cross-pipes 5 which are spaced out at predetermined distances in the back-and-forth direction. Each of the main pipes 2 is bent upward at its central part towards the rear of the body frame 1, such that a rear half of the main pipe 2 is higher than a front half of the main pipe 2, relative to the ground level.

A front frame part 8 of the body frame 1 is formed integrally with a front part of the main pipe 2. On an upper part of the front frame part 8, there are arranged a steering wheel 10, a shift lever 11 for operating the transmission, an operation lever 12 for changing drive modes between a two-wheel drive and a four-wheel drive. Also, a front cover 13 is mounted on the upper part of the front frame part 8. A seat support frame 14 is integrally formed with the central part of the main pipe 2, and a seat 15 is mounted on top of the seat support frame 14.

A front reduction gear mechanism 20 built in a front reduction gear case 20a for the front wheels 22 is mounted on a lower part of the front frame part 8. The front reduction gear mechanism 20 has a differential gear mechanism and a pair of front axle shafts 21, for the front wheels, which project from the front reduction gear case 20a in a direction of the width of the body frame 1 (hereinafter, also referred to as "width direction"), i.e. in the direction of the right and left, respectively. Each front axle shaft 21 is supported resiliently from above by a shock absorber 23 for the front wheels 22, while each front axle shaft 21 is connected to the front wheel 22 so as to be able to steer the wheel 22 through a steering mechanism of the vehicle.

On top of the rear half of the main pipes 2, there are arranged a load carrying platform (cargo bed) 24 and a rear fender 25. There is also arranged a cabin frame 26 made of pipes, for covering the driver, extending from the front of the front frame part 8 up to the rear of the seat 15, so as to pass over the upper space of the driver.

A swing arm 30 extending rearward is supported on the cross pipe 5 located below the seat 15 at a swinging point M1 such that the swing arm 30 can swing in the direction of up and down. An engine 33 and a transmission case 35 for a transmission 34 of the vehicle are mounted on the swing arm 30 extending in the back-and-forth direction, in this order. A rear reduction gear mechanism 36 for the rear wheels 32 and a pair of rear axle shafts 31 for the rear wheels 32 are built in the rear lower part of the transmission case 35. Each of the rear axle shafts 31 projects from the transmission case 35 and is coupled to each of the rear wheels 32. A power takeoff part 50 for driving the front wheels 22, is provided on the left lower part of the transmission case 35.

Figure 2:
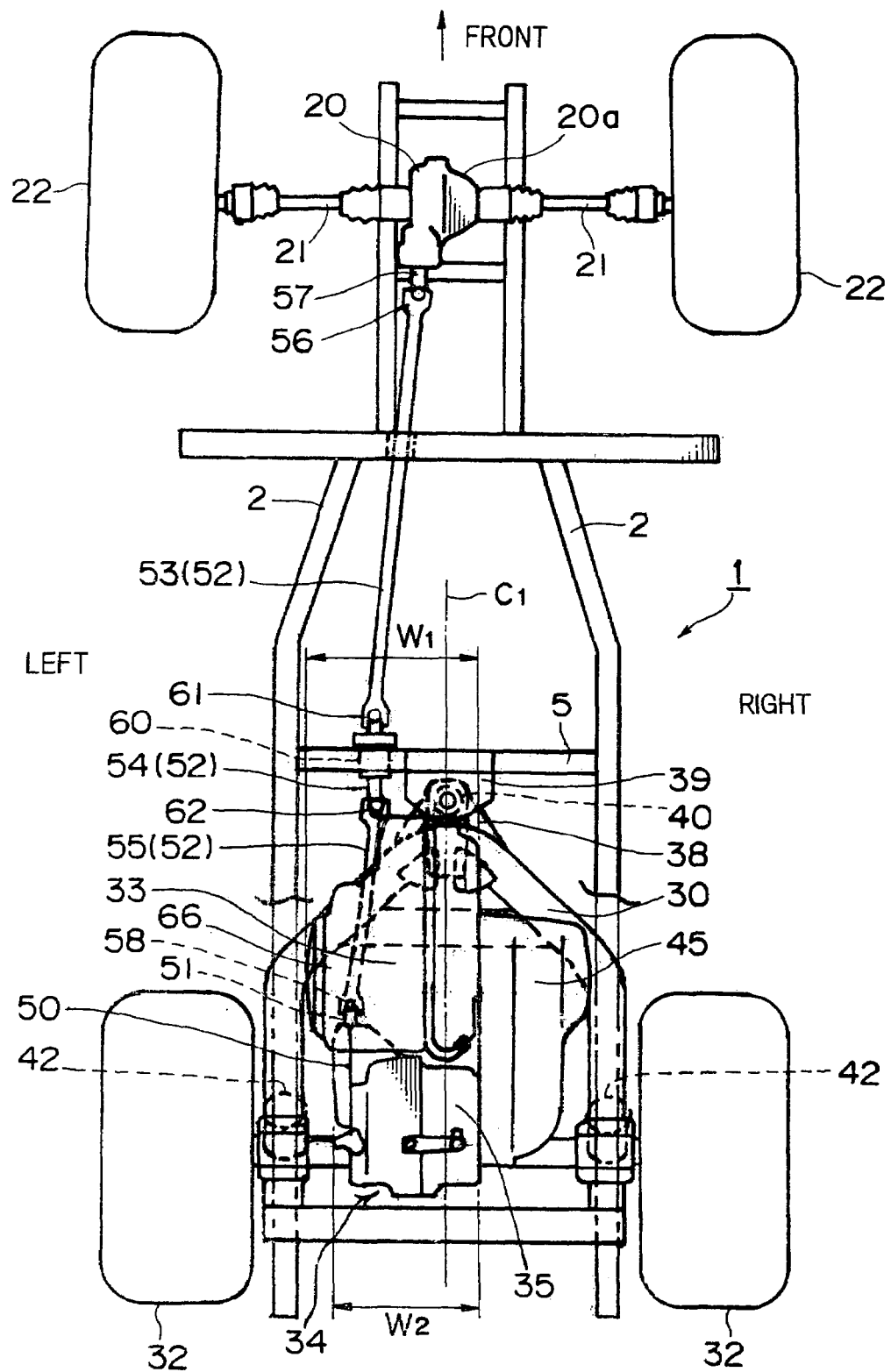
FIG. 2 is a plan view of the four-wheel drive vehicle of FIG. 1, showing a body frame (i.e. vehicle body) and a power transmission device thereof.

FIG. 2 is a plan view of the body frame 1 and a power transmission device. The swing arm 30 is made of a member in the form of a pipe. The front part of the swing arm 30 is formed in a shape of a mountain, and the swing arm 30 is formed, as a whole, in the shape of a home plate in baseball game (i.e. a house-shaped pentagon) when viewed from the top, as shown in FIG. 2. A supporting bracket 38 projecting forward is provided on the front part of the swing arm 30, and a supporting bracket 39 projecting rearward is provided on a central portion of the cross pipe 5, immediately under the seat 15, in the width direction. In the construction, the supporting bracket 38 of the swing arm 30 is supported to the supporting bracket 39 of the cross pipe 5, through a sphere joint (pillow ball joint) 40. Thereby, the swing arm 30 can swing in the direction of the up and down, and also can tilt and/or swing in the direction of the right and left (i.e. width direction) to some extent.

Figure 5:
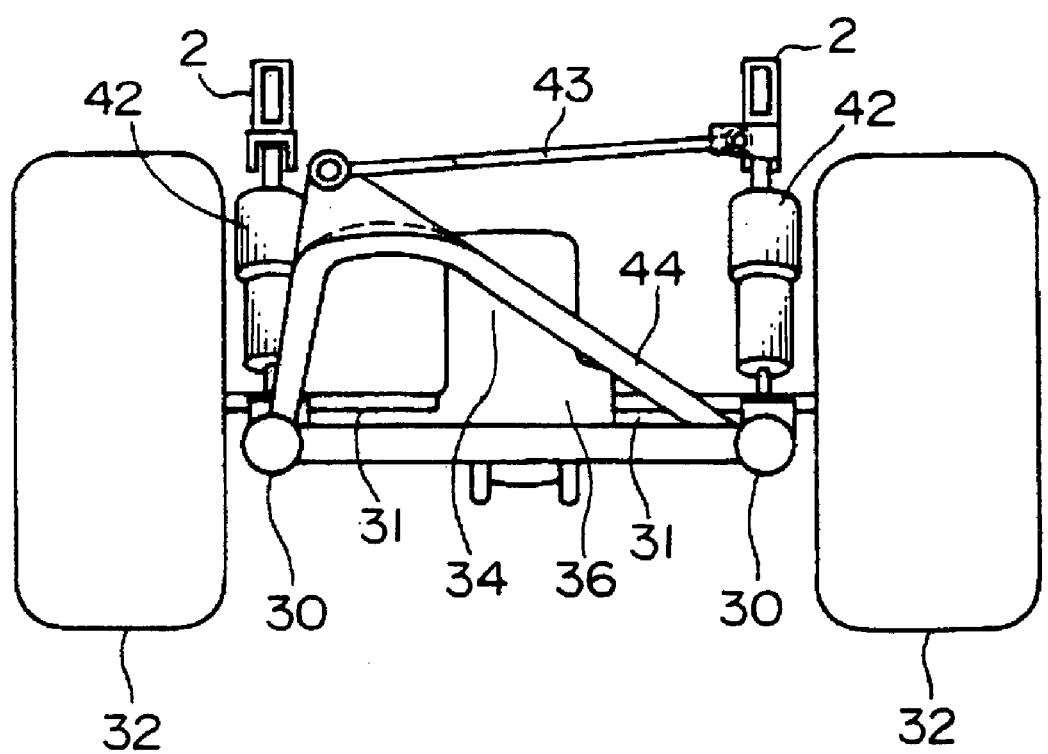
FIG. 5 is a rear view of the four-wheel drive vehicle of FIG. 1, showing the swing arm.

FIG. 5 is a rear view of the swing arm 30 and other parts. As shown in the figure, right and left rear portions of the swing arm 30 is resiliently supported from above by a pair of right and left shock absorbers 42 for the rear wheels 32, and the swinging thereof in the direction of the right and left is controlled by a control link 43 within a certain definite range. That is, a mountain-shaped (or L-shaped) pipe 44 is fixed to the rear part of the swing arm 30, where the pipe 44 is in the form of having an apex which locates on a left side with respect to a center line C1 (FIG. 2) in the width direction of the body frame 1, as shown in FIG. 5. In the construction, both edge parts of the control link 43 are connected to the apex of the pipe 44 and the right main pipe 2 through pivoting pins. With the arrangement, the swing and tilt of the swing arm 30 in the direction of the right and left, are controlled with the certain definite range.

Figure 3:
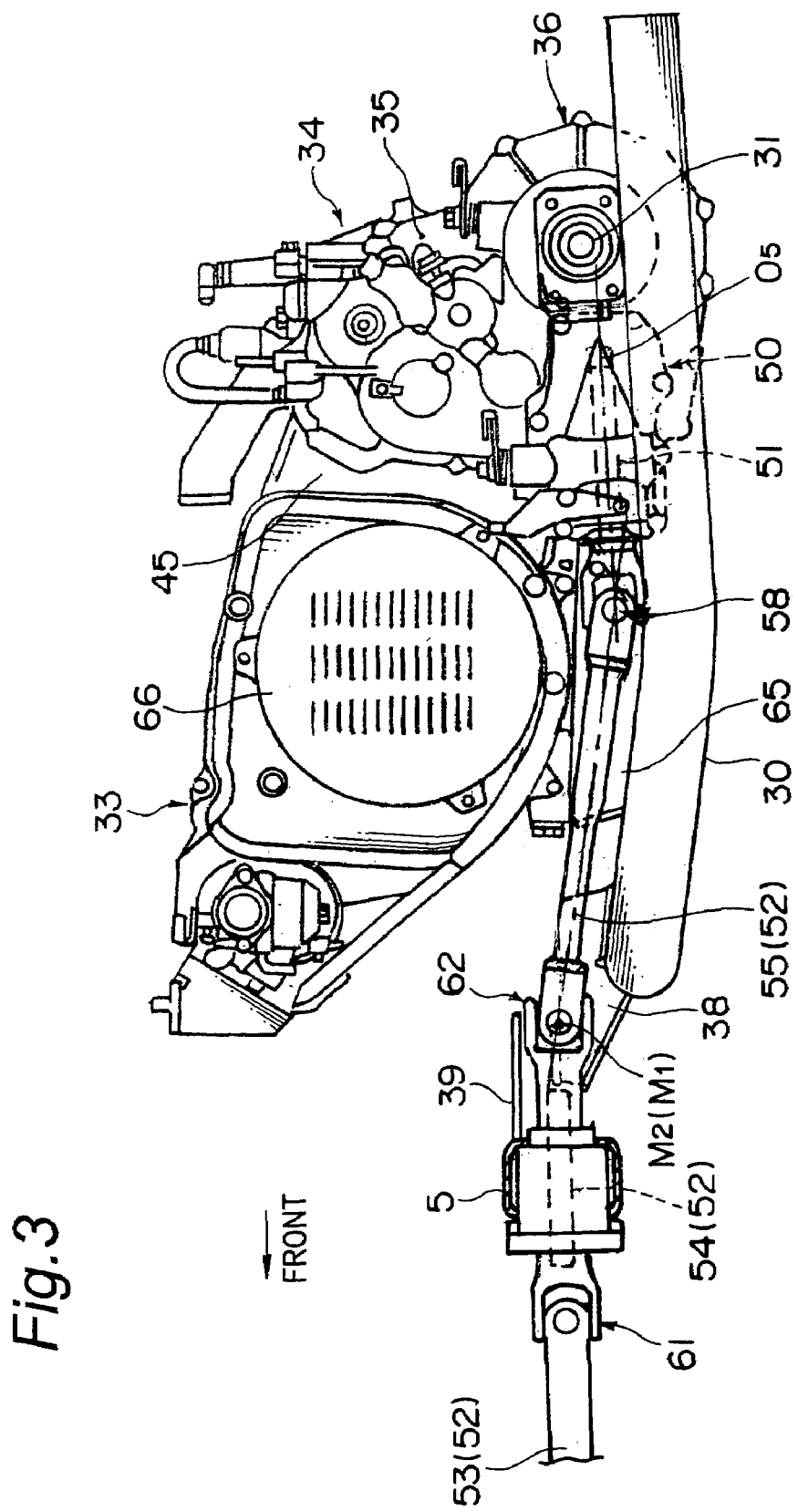
FIG. 3 is a left side enlarged view of the four-wheel drive vehicle of FIG. 1, showing a swing arm, an engine, and a transmission thereof.

FIG. 3 is a left side enlarged view of the swing arm 30 and some other parts. As shown in the figure, the swing arm 30 is formed bent a little bit as a V-shape with its apex being under. Namely, the swing arm 30 is bent approximately at its central part in the back-and-forth direction such that the central part of the swing arm 30 projects downwards, in which the front half thereof tilts downwards rearwards and the rear half thereof tilts upwards rearwards.

As shown in FIG. 3, the engine 33 and the transmission case 35 are arranged above the swing arm 30 in this order with respect to the direction from the front of the body frame 1 towards the rear. The engine 33 is, for example, a multi-purpose engine with a single cylinder. The engine 33 is supported on an engine base 65 which is provided on the front half of the swing arm 30 so as to project upwards as shown in the figure. On the left side of the engine 33, there is a fan case 66 for cooling the engine 33. A power takeoff shaft 51 of the power takeoff part 50 projects forwards from the left lower part of the transmission case 35 for driving the front wheels.

As shown in FIG. 2, center lines of the engine 33 and the transmission case 35 of the transmission 34, in the width direction of the body frame 1, locate on a left side relative to the center line C1 of the body frame 1. In the arrangement, each of the right side surfaces of the engine 33 and the case 35 is generally coplanar with a vertical plane which is parallel with the center line C1. On the right side of the engine 33 and the transmission case 35, a belt converter 45 is mounted. That is, the belt converter 45 is positioned opposite to the power takeoff part 50 with respect to the center line C1. In other words, the belt converter 45 locates on the right side of the engine 33 and the transmission case 35, and the power takeoff part 50 locates on the left side of the engine 33 and the transmission case 35. The belt converter 45 has the function to transmit the engine power from the engine 33 to the transmission 34.

A width W2 between the right and left sides of the transmission case 35 including the power takeoff part 50, is smaller than the width W1 between the right and left sides of the engine 33. As mentioned above, the right side surface of the engine 33 and the right side surface of the transmission case 35, are generally coplanar with the same vertical plane. Therefore, the left side surface of the power takeoff part 50 locates on the side of the center line C1 with respect to the left side surface of the engine 33. The power takeoff shaft 51 projecting forward from the transmission case 35, is connected to an input shaft 57 of the front reduction gear mechanism 20, through a propeller shaft 52 extending in the back-and-forth direction of the body frame 1, such that the engine power can be transmitted from the power takeoff shaft 51 to the input shaft 57.

As shown in FIG. 2, the propeller shaft 52 is composed of three propeller shaft members 53, 54, 55 locating on the front side, middle side and rear side, respectively, in the back-and-forth direction. Hereinafter, the three propeller shaft members 53, 54, 55 are referred to as front propeller shaft member 53, intermediate propeller shaft member 54, and rear propeller shaft member 55, respectively. The rear propeller shaft member 55 is coupled to the power takeoff shaft 51 through a universal joint 58 locating at the rear part of the rear propeller shaft member 55. The rear propeller shaft member 55 extends inside a space under the fan case 66 of the engine 33 such that the member 55 extends a little bit rightward forward. A front part of the rear propeller shaft member 55 is coupled to a rear part of the intermediate propeller shaft member 54 through a universal joint 62. The intermediate propeller shaft member 54 is rotatably supported inside a bearing housing 60 arranged in the cross pipe 5 immediately under the seat 15. A front part of the intermediate propeller shaft member 54 is coupled to a rear part of the front propeller shaft member 53 through a universal joint 61. The front propeller shaft member 53 extends slantingly forward from the rear part thereof such that the member 53 approaches to the center line C1 of the body frame 1. A front part of the front propeller shaft member 53 is coupled to the input shaft 57 of the front reduction gear mechanism 20 through a universal joint 56. By the way, the bearing housing 60 for the intermediate propeller shaft member 54 locates on the left side of the center line C1.

Returning to FIG. 3, the power takeoff shaft 51 is arranged such that the power takeoff shaft 51 tilts downwards forwards generally in parallel with the rear half of the swing arm 30. The shaft 51 projects into a space under the fan case 66. Meanwhile, the rear propeller shaft member 55 is arranged such that the member 55 tilts downwards rearwards generally in parallel with the front half of the swing arm 30. The member 55 passes through the space under the fan case 66. Namely, the power takeoff shaft 51 and the rear propeller shaft member 55 are arranged in a form of a V-shape with its apex being under, in which the universal joint 58 locates at the apex portion of the V-shape. In the construction, the lower part of the fan case 66 is positioned inside the upper open space of the V-shape. The rear propeller shaft member 55 and the power takeoff shaft 51 are positioned between the swing arm 30 and the lower part of the engine 33, as shown in FIG. 3. A swinging point M2 of the front part of the rear propeller shaft member 55, namely, the center point of the universal joint 62, has approximately the same height as that of the swinging point M1 of the swing arm 30, and they are positioned almost at the same location in the back-and-forth direction.

Figure 4:
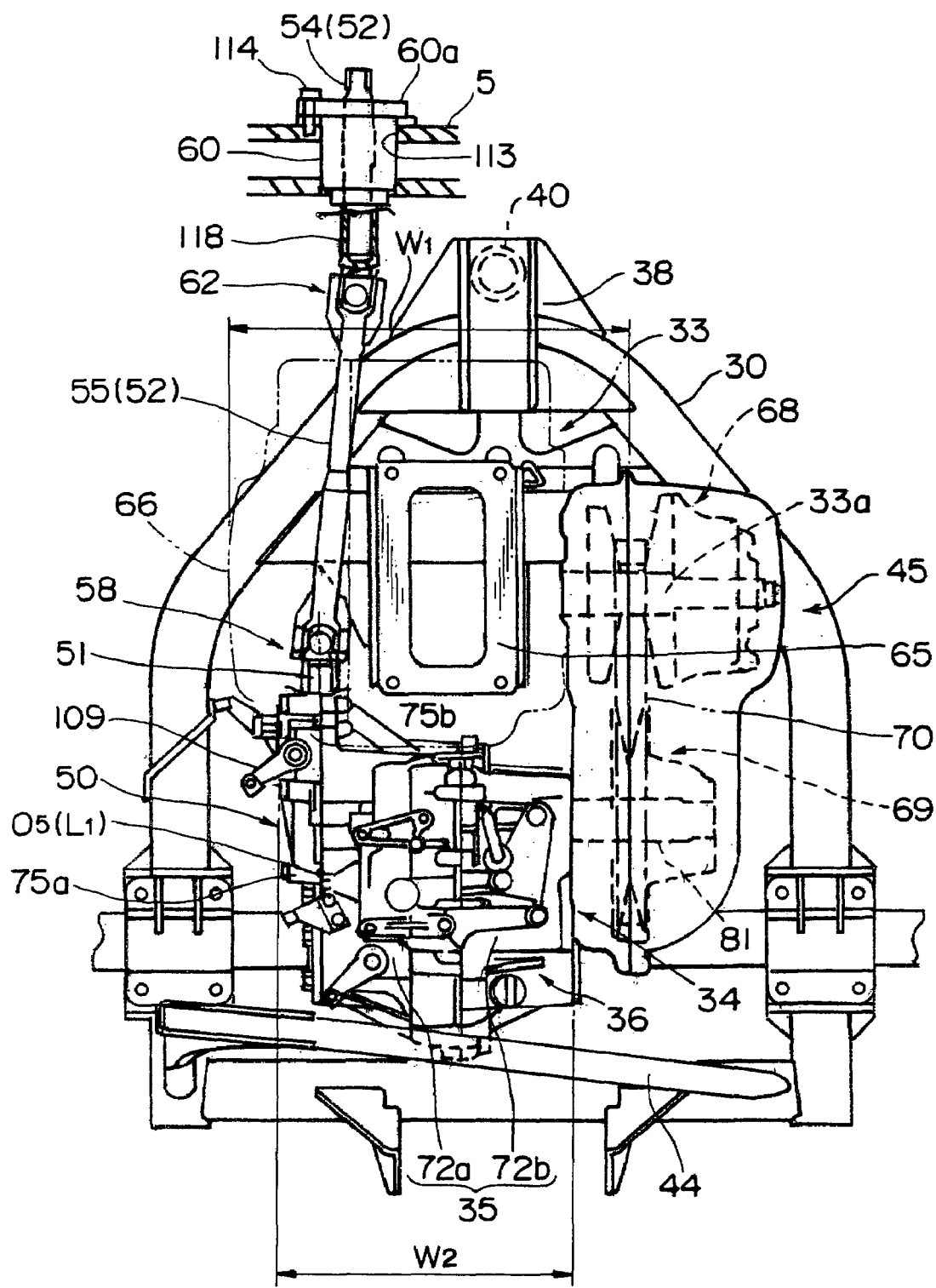
FIG. 4 is a plan view of FIG. 3, in which the engine is removed and shown by imaginary line.

FIG. 4 is an enlarged plan view showing the swing arm 30, the engine 33, the transmission 34, and the belt converter 45. In the figure, the engine 33 is shown by an imaginary line. The belt converter 45, locating on the right side of the engine 33 and the transmission 34, is a V-belt type stepless speed change device, for example. The belt converter 45 has a drive pulley 68 which is fixed to an output shaft (i.e. drive shaft) of the engine 33, and has a driven pulley 69 which is fixed to an input shaft 81 of the transmission 34. The belt converter 45 also has a V-belt 70 extending between the pair of pulleys 68, 69. The belt converter 45 has the function to perform automatic shift in speed, in accordance with rotational speed of the engine 33 and/or in accordance with increase and decrease of load exerted upon the wheels.

Figure 6:
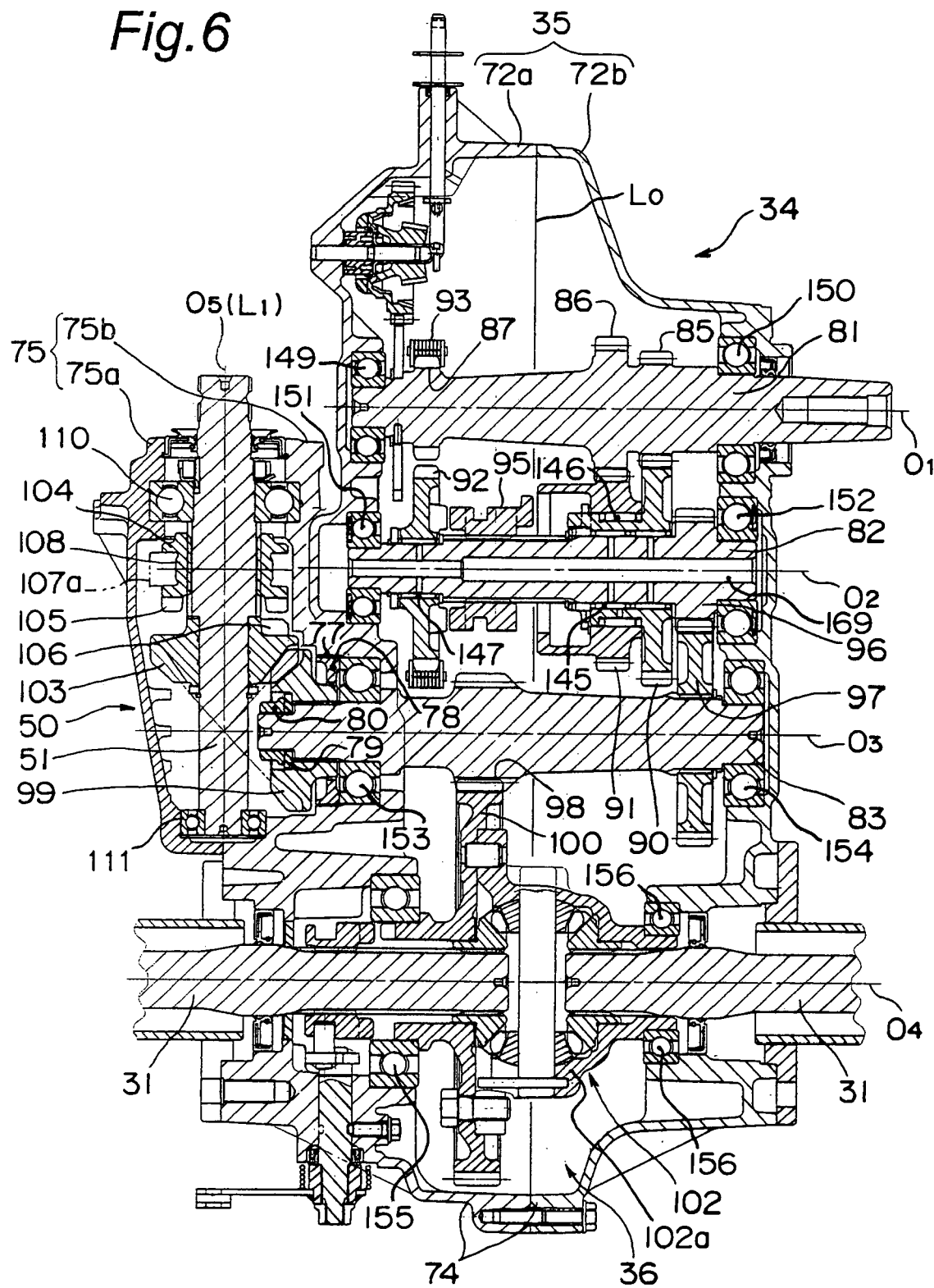
FIG. 6 is a cross-sectional view of the transmission which is shown by cutting the same by a plane passing through each shaft for the transmission.

FIG. 6 is a view showing an internal mechanism of the transmission 34. More specifically, the figure is a cross sectional view shown by cutting the internal mechanism with a plane which passes through the input shaft 81, a counter shaft 82, and a transmission output shaft 83 for the shift transmission, through each shaft axis O1, O2, O3 and O4 of the rear axle shaft 31 (FIG. 7), and through a shaft axis O5 of the power takeoff shaft 51. As shown in the figure, the transmission case 35 of the transmission 34, is composed of a pair of right and left transmission cases 72b, 72a. The pair of cases 72b, 72a are jointed to each other at a location of their mating face $L_0$.

The rear lower part of the transmission case 35 is formed integrally with a rear reduction gear case accommodating the rear reduction gear mechanism 36 for the rear wheels 32. The left lower part of the transmission case 35 is formed integrally with a right half case part 75b of a power takeoff shaft case 75 accommodating the power takeoff shaft 51 for driving the front wheels 22. In the construction, a left half case part 75a of the power takeoff shaft case 75, as a member separate from the transmission case 35, is joined to a mating face L1 of the right half case part 75b formed integrally with the transmission case 35. The mating face L1 locating between the left half case part 75a and the right half case part 75b is a vertical face including the shaft axis O5 of the power takeoff shaft 51.

The transmission 34 is constructed such that it can perform a change between a forward movement and a rearward movement of the vehicle, and can perform a change between a low speed and a high speed in the forward movement, for example. As shown in FIG. 6, from top down in the figure, there are arranged the input shaft 81, the counter shaft 82 locating in the middle as an intermediate shaft, and the transmission output shaft 83, as shift transmission shafts inside the transmission case 35. Also, on the rear side of the transmission output shaft 83, there are arranged the rear reduction gear mechanism 36 having a differential gear mechanism 102 and the rear axle shafts 31 connected to the differential gear mechanism 102.

More specifically, the input shaft 81 is rotatably supported by the transmission case 35 with right and left ball bearings 150, 149. From the right to left in FIG. 6, a low-speed gear 85 for forward movement, a high-speed gear 86 for forward movement, and a drive sprocket 87 for backward movement, are formed integrally with the outer circumference of the input shaft 81. The counter shaft 82 is rotatably supported by the transmission case 35 with right and left ball bearings 152, 151 which are provided with seals. On the counter shaft 82, there are arranged a low-speed intermediate gear 90 and a high-speed intermediate gear 91, from the right to left in FIG. 6. The low-speed intermediate gear 90 rotatably engages with the counter shaft 82 through a needle roller bearing 145, and the high-speed intermediate gear 91 rotatably engages with the counter shaft 82 through a needle roller bearing 146, where the low-speed intermediate gear 90 engages with the low-speed gear 85 on the input shaft 81 and the high-speed intermediate gear 91 engages with the high-speed gear 86 on the input shaft 81, respectively. A driven sprocket 92 rotatably engages with the counter shaft 82 through a needle roller bearing 147, where the driven sprocket 92 is driven by a chain 93 which engages with the drive sprocket 87 on the input shaft 81. Between the high-speed intermediate gear 91 and the driven sprocket 92, a shift sleeve 95 is mounted on the counter shaft 82 such that the shift sleeve 95 spline-engages with the counter shaft 82 slidably in the axial direction. Also, an intermediate output gear 96 is integrally formed with the counter shaft 82 on the right side of the low-speed intermediate gear 90.

The transmission output shaft 83 is rotatably supported by the transmission case 35 with right and left ball bearings 154, 153. A transmission output shaft drive gear 97 engaging with the intermediate output gear 96 is fixed to the outer circumference of the transmission output shaft 83. On the intermediate portion of the transmission output shaft 83 in the width direction of the body frame 1, an output gear 98 is formed integrally with the transmission ouput shaft 83.

The left edge part of the transmission output shaft 83 projects inside the power takeoff shaft case 75. A drive bevel gear 99 is fixed to the projecting left edge part of the transmission output shaft 83. The drive bevel gear 99 spline-engages with the left edge part of the transmission output shaft 83, such that the gear 99 is prevented from dropping off from the shaft 83 in the axial direction, by a stuffing nut 80 which is secrewed on the left edge part of the shaft 83 via a washer 79 between them. Also, an outer race of the left ball bearing 153 is fixed to the transmission case 35 by an engagement ring 78 which is screwed to an internal thread 77 formed in a bearing hole for supporting the ball bearing 153.

The rear reduction gear mechanism 36 has a differential input gear (i.e. differential case gear) 100 engaging with the output gear 98 of the transmission output shaft 83, and has the differential gear mechanism 102 through which the driving power of the rear wheels 32 is transmitted from the input gear 100 to the rear axle shafts 31. The right and left edge parts of a differential gear case 102a of the differential gear mechanism 102, are rotatably supported on the rear reduction gear case 74 through a pair of bearings 155, 156.

The power takeoff shaft 51 for driving the front wheels 22, extends forwards in a state in which the power takeoff shaft 51 is perpendicular to each of the input, counter and transmission output shafts 81, 82, 83. The power takeoff shaft 51 is rotatably supported on the power takeoff shaft case 75 through a front bearing 110 and through a rear bearing 111. A driven bevel gear 103 engaging with the drive bevel gear 99 of the transmission output shaft 83, is mounted on the circumference of the power takeoff shaft 51 such that the driven bevel gear 103 relatively rotatably engages with the power takeoff shaft 51. On the power takeoff shaft 51, there is mounted a drive selector mechanism for changing drive modes between a two-wheel drive and a four-wheel drive. The drive selector mechanism is composed of a selector sleeve 104, a selector arm 107 (see FIG. 9; only an engagement pin 107a being shown in FIG. 6), and so on.

Figure 7:
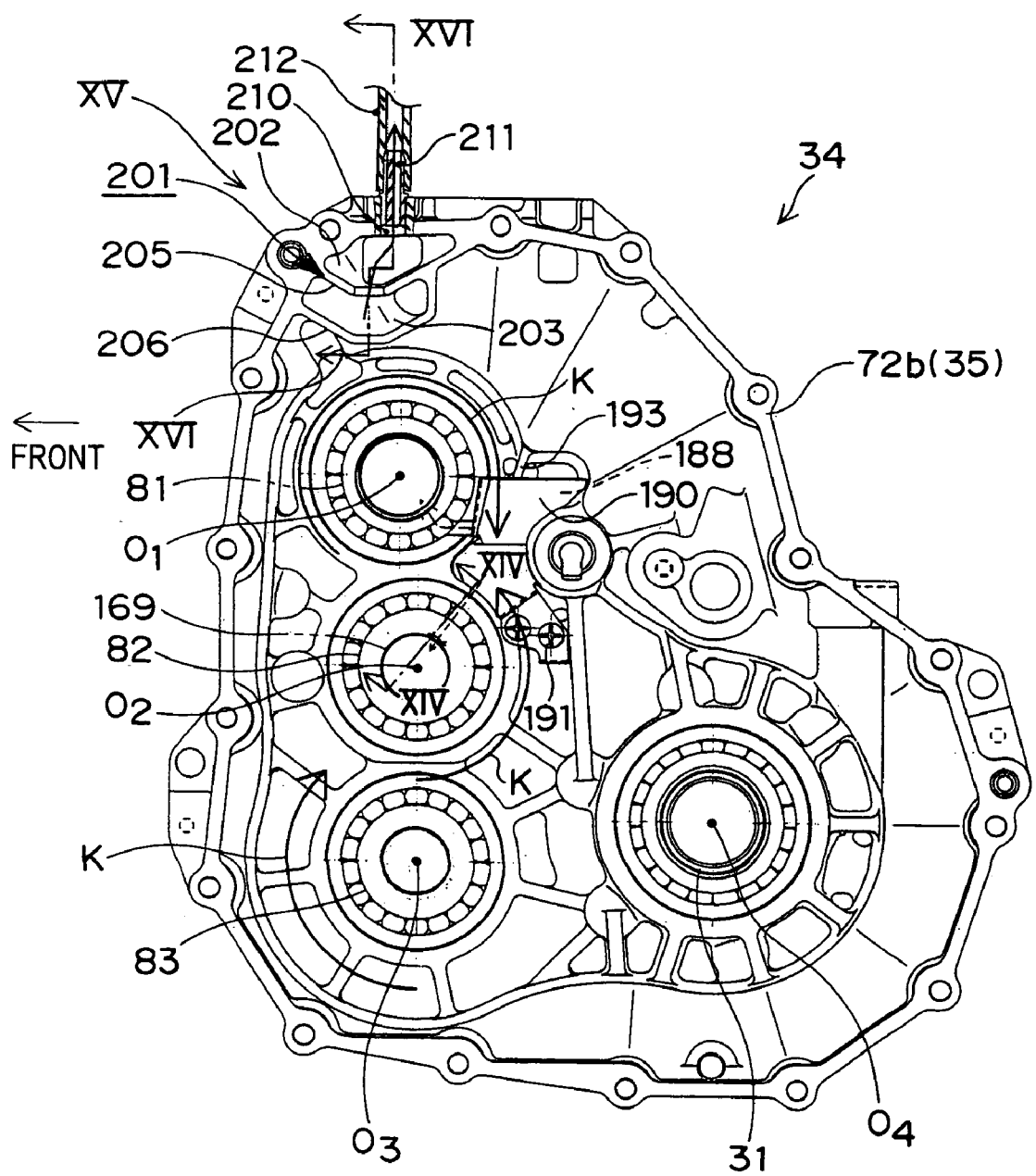
FIG. 7 is a left side view (left interior view) of a right transmission case member.

The axis O1 of the input shaft 81, the axis O2 of the counter shaft 82, and the axis O3 of the transmission output shaft 83, housed inside the transmission case 35, are generally arranged in a straight vertical line, when they are seen from one side as shown in FIG. 7. However, in detail, the axis O1 of the input shaft 81 locates a bit forward of the axis O2 and the axis O3. The rear axle shaft 31 locating rearward of the transmission output shaft 83, is positioned at a location a bit higher than that of the transmission output shaft 83.

Figure 9:
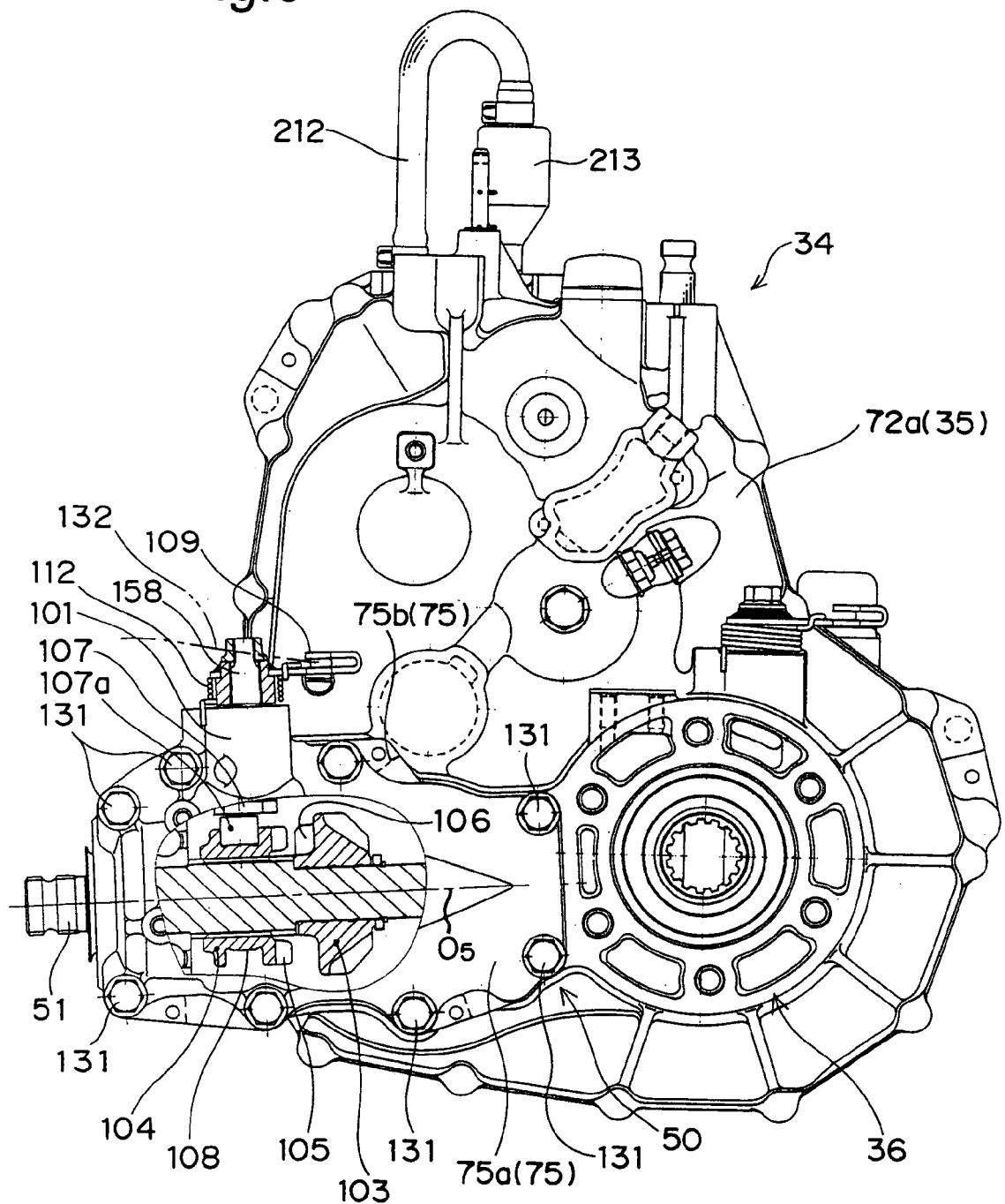
FIG. 9 is a left side view of the transmission partially cut away, showing part of a power takeoff part for driving front wheels as a longitudinal cross-sectional view.

FIG. 9 is a side view of the transmission 34, in which a vertical sectional view of the power takeoff part 50 is shown. As shown in the figure, the left half case part 75a of the power takeoff part 50 is fixed to the right half case part 75b (FIG. 6) by a plurality of bolts 131. The selector sleeve 104 having an annular groove 108 spline-engages with the outer circumference of the power takeoff shaft 51 such that the sleeve 104 can slide on the outer circumference thereof in the axial direction (i.e. in the back-and-forth direction). On an edge surface of the selector sleeve 104, and on an edge surface, facing the edge surface of the selector sleeve 104, of the driven bevel gear 103, dog claws 105 and 106 which can engage with each other, are formed, respectively. The engagement pin 107a of the selector arm 107 engages with the annular groove 108 formed on the selector sleeve 104, and the selector arm 107 is fixed to a vertical pivot (i.e. rotation shaft) 158. The pivot 158 is rotationally supported by a boss part 101 formed on an upper part of the left half case part 75a, where the pivot 158 projects upwards. A selector lever 109 is fixed to an upper part of the pivot 158. The selector lever 109 is interlocked with the operation lever 12 (FIG. 1) through a wire 132 for example.

Figure 10:
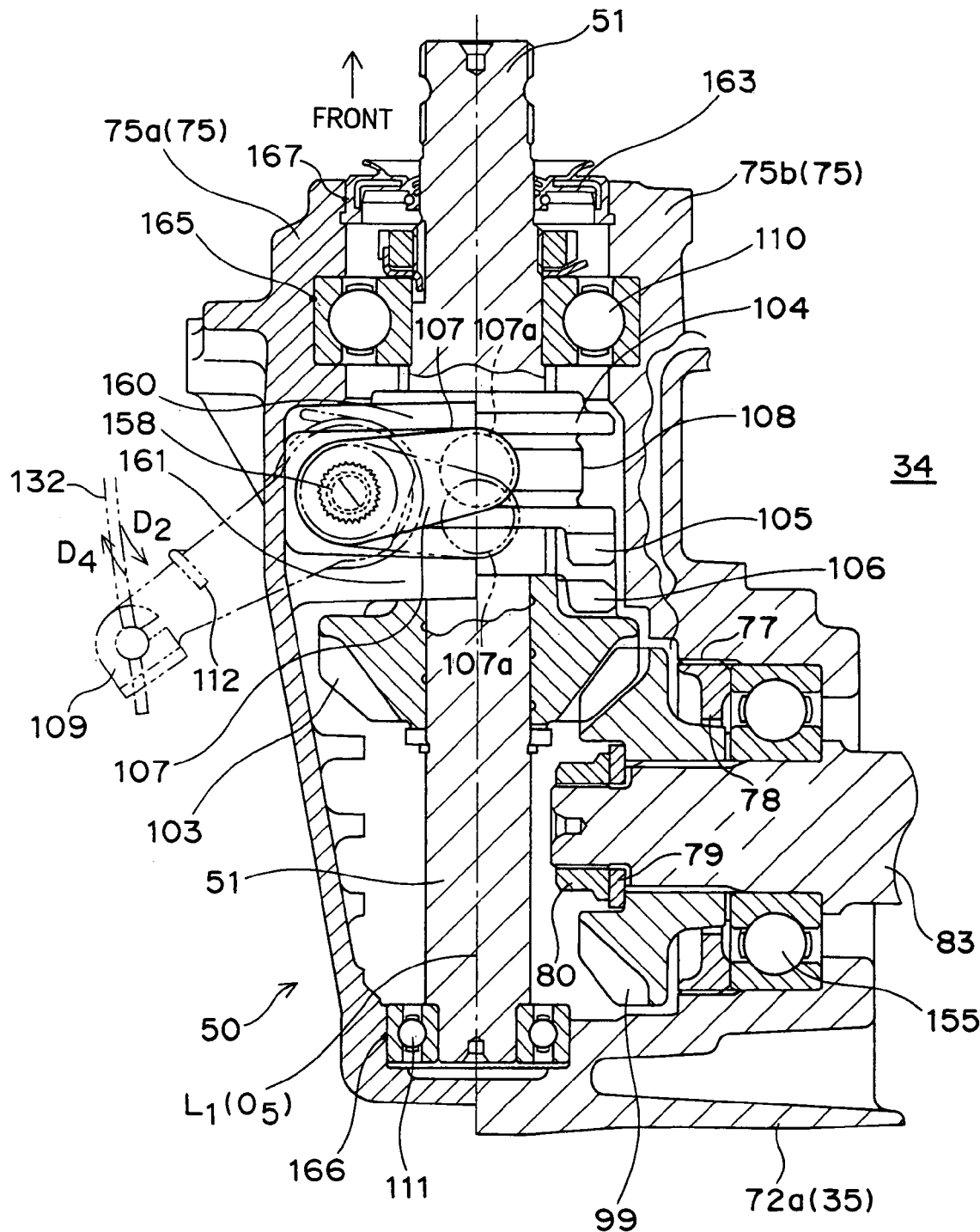
FIG. 10 is a horizontal cross-sectional enlarged view of the power takeoff part for driving the front wheels.

FIG. 10 is a horizontal cross-sectional enlarged view of the power takeoff part 50. The selector arm 107 is constructed so as to swing back and forth when the pivot 158 is rotated. There are mounted a pair of stoppers 160, 161 at locations sandwiching the selector arm 107 in the back-and-forth direction. The stopper 160 locating forward of the selector arm 107 is employed for the two-wheel drive, and the stopper 160 can lock the selector arm 107 at the two-wheel drive position (shown by a solid line). On the other hand, the stopper 161 locating backward of the selector arm 107 is employed for the four-wheel drive, and the stopper 161 can lock the selector arm 107 at the four-wheel drive position (shown by an imaginary line). The selector lever 109 is urged in a counterclockwise direction (i.e. towards the two-wheel drive position), as shown by an arrow D2 in FIG. 10, by a coil spring 112.

With the above mechanism, when the four-wheel drive is desired, the selector lever 109 is rotated in a clockwise direction as shown by an arrow D4 (i.e. towards the four-wheel drive position) via the wire 132 by manipulating the operation lever 12 shown in FIG. 1. Thereby, the selector arm 107 rotates backwards around the pivot 158, the selector sleeve 104 is moved backwards to the four-wheel drive position, the dog claws 105, 106 engage with each other, and the driven bevel gear 103 and the power takeoff shaft 51 come to engage with each other through the selector sleeve 104 such that the driven bevel gear 103 and the power takeoff shaft 51 rotate together.

Meanwhile, when the two-wheel drive (i.e. drive by the rear wheels 32 only) is desired, the operation lever 12 in FIG. 1 is manipulated such that the lever 12 is shifted towards a side of the two-wheel drive. Thereby, the selector lever 109 in FIG. 10 is rotated counterclockwise as shown by the arrow D2 toward the two-wheel drive by the resilience of the coil spring 112. Then, the selector arm 107 is rotated forward toward the two-wheel drive position, the pair of dog claws 105, 106 disengage from each other, and the power from the engine 33 is cut off between the driven bevel gear 103 and the power takeoff shaft 51.

As shown in FIG. 10, the inner circumferential surfaces of the right and left half case parts 75b, 75a of the power takeoff shaft case 75 have inner periphery mounting surfaces 165, 166, 167 for supporting the front bearing 110, the rear bearing 111 and a seal 163. The inner periphery mounting surfaces 165, 166, 167 are machined together with the left transmission case member 72a of the transmission case 35 (see FIG. 6), in a state in which the right and left half case parts 75b, 75a are connected to each other. The shaft bearings 110, 111 and the seal 163 are directly mounted on the inner peripheral surface of the power takeoff shaft case 75, without making use of a bearing holder, etc. as a separate member independent of the power takeoff shaft case 75.

Returning to FIG. 6, as aforementioned, the low-speed intermediate gear 90, the high-speed intermediate gear 91 and the driven sprocket 92 are relatively rotationally mounted on the counter shaft 82 through the needle roller bearings 145, 146, 147. In the construction, there is provided an oil supplying device inside the transmission 34, by which an oil is supplied to each of the needle roller bearings 145, 146, 147 locating around the counter shaft 82.

Figure 8:
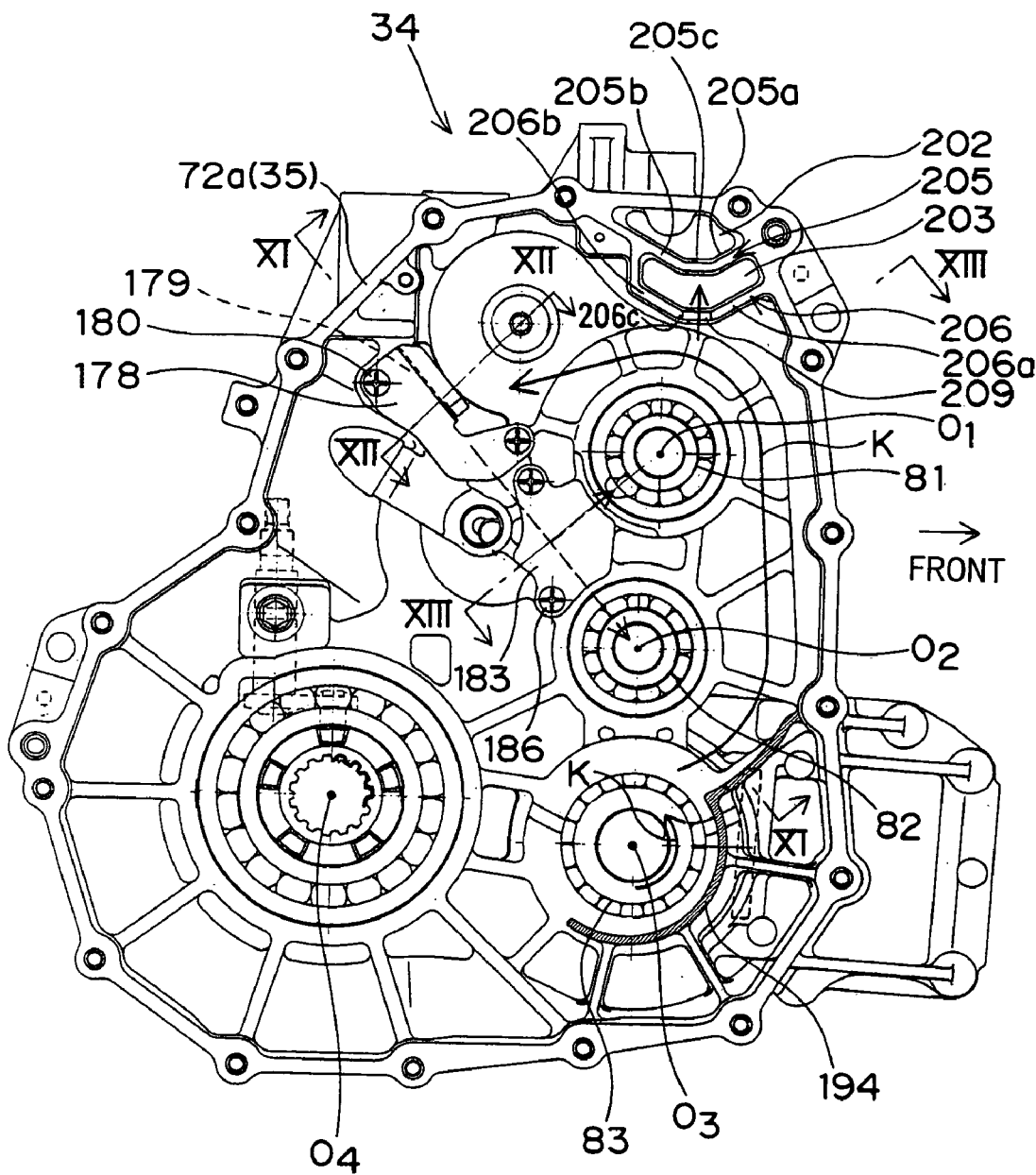
FIG. 8 is a right side view (right interior view) of a left transmission case member.
Figure 11:
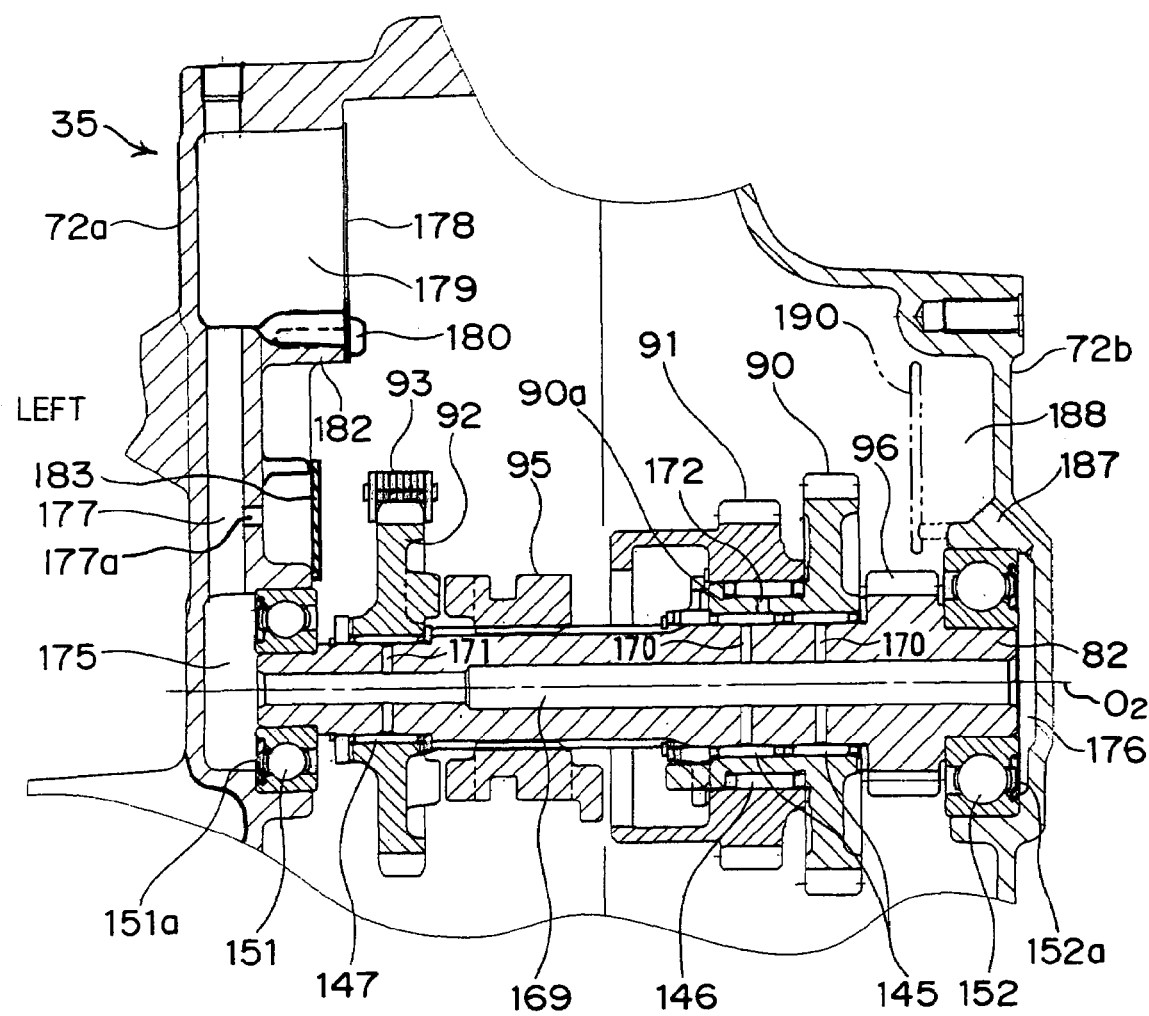
FIG. 11 is an enlarged cross-sectional view taken approximately in line XI-XI of FIG. 8, showing an oil supplying device thereof.

FIG. 11 is an enlarged cross-sectional view taken approximately in line XI-XI of FIG. 8, showing the counter shaft 82. With reference to the figure, it is explained about the engagement structure of each of the low-speed and high-speed intermediate gears 90, 91 in detail. The low-speed intermediate gear 90 rotationally engages with the outer periphery of the counter shaft 82 (i.e. the gear 90 can rotate relative to the counter shaft 82), through the right and left needle roller bearings 145. Meanwhile, the high-speed intermediate gear 91 rotationally engages with the low-speed intermediate gear 90 (i.e. the gear 91 can rotate relative to the low gear 90), through the needle roller bearing 146 which is positioned between the high-speed intermediate gear 91 and an outer peripheral surface of a boss part 90a of the low-speed intermediate gear 90.

As the oil supplying device, an oil passage 169 extending and penetrating through the whole length of the counter shaft 82 is formed inside a core part of the counter shaft 82. The counter shaft 82 has oil supplying holes 170, 171 which extend radially outwardly from the oil passage 169 and fluidically communicate with the needle roller bearings 145, 147 locating on the outer surface of the counter shaft 82 so as to allow the oil to flow. In addition, the boss part 90a of the low-speed intermediate gear 90 has an oil supplying hole 172 which extends radially outwardly from an innder peripheral surface of the boss part 90a and fluidically communicates with both of the needle roller bearing 145 locating on the inner side of the boss part 90a and the needle roller bearing 146 locating on the outer side of the boss part 90a so as to allow the oil to flow as well. A left oil chamber 175 is formed between the left transmission case 72a and the left ball bearing 151 with its seal which locates on the left side of the counter shaft 82, and a right oil chamber 176 is formed between the right transmission case 72b and the right ball bearing 152 with its seal which locates on the right side of the counter shaft 82, respectively. The oil chambers 176, 175 fluidically communicate with right and left openings of the oil passage 169 of the counter shaft 82.

The left oil chamber 175 fluidically communicates with a left oil intake chamber 179 locating above, through a left oil intake passage 177 extending upwards and rearward from the left oil chamber 175. The left oil intake passage 177 is formed inside the left transmission case 72a. The left oil intake chamber 179 is formed by a damming plate 178 which is fixed to an inner rib 182 of the left transmission case 72a by a tapping screw 180.

Figure 12:
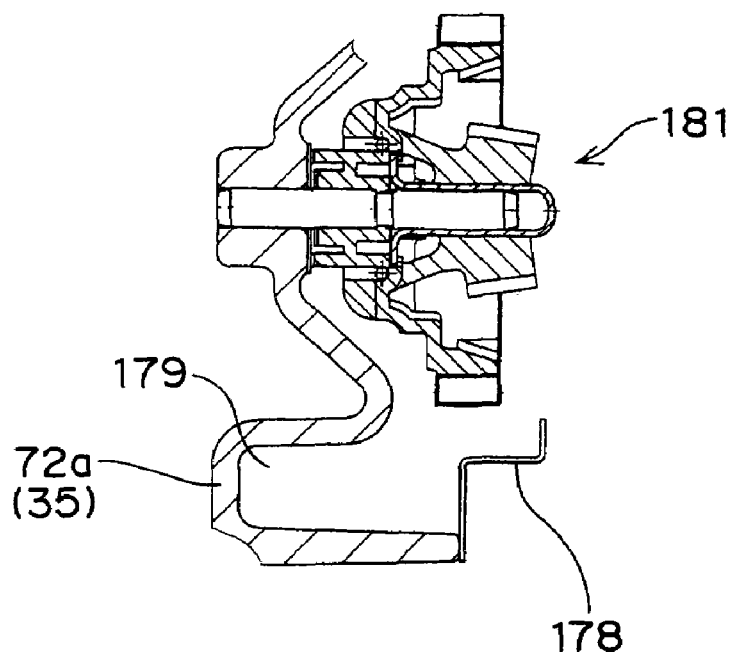
FIG. 12 is an enlarged cross-sectional view taken approximately in line XII-XII of FIG. 8.

FIG. 12 is an enlarged cross-sectional view taken approximately in line XII-XII of FIG. 8. The left oil intake chamber 179 locates under a grand governor 181, having a rotational gear locating in an upper position, and the chamber 179 opens upwards inside the transmission case 35. Thereby, the oil intake chamber 179 can receive oil splashed from the grand governor 181 efficiently.

Figure 13:
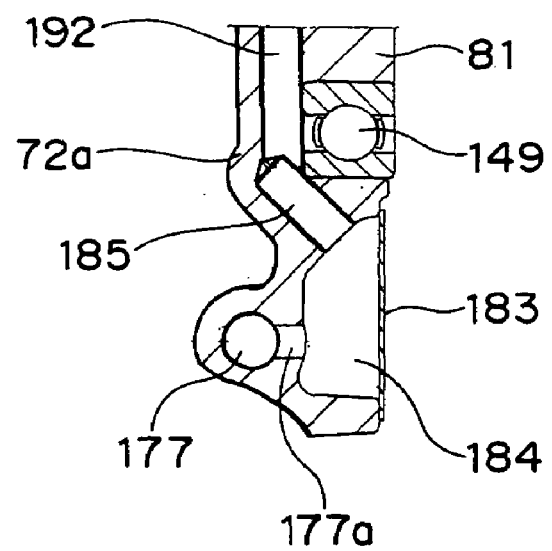
FIG. 13 is an enlarged cross-sectional view taken approximately in line XIII-XIII of FIG. 8.
Figure 14:
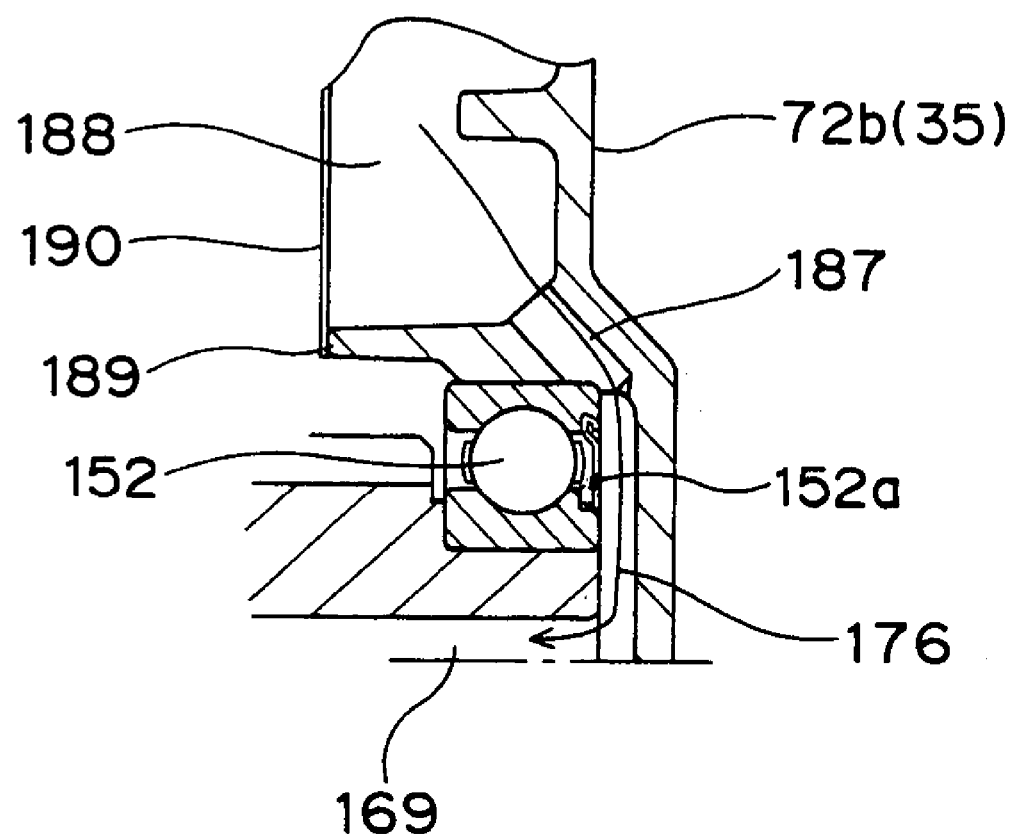
FIG. 14 is an enlarged cross-sectional view taken approximately in a line XIV-XIV of FIG. 7.

FIG. 13 is an enlarged cross-sectional view taken approximately in line XIII-XIII of FIG. 8. As shown in the figure, the left transmission case 72a has a branch passage 177a which fluidically communicates with the left oil intake passage 177. The branch passage 177a fluidically communicates with a space 192 on the left side of the input shaft 81, through an oil chamber 184 formed by a damming plate 183 and through a passage 185. Thereby, the left ball bearing 149 supporting the input shaft 81 is supplied with the oil. The damming plate 183 is fixed to the left transmission case 72a by a tapping screw 186, as shown in FIG. 8.

As shown in FIG. 8, an oil guide rib 194, which is circular in shape, is formed partially around the transmission output shaft 83 so as to surround the transmission output shaft 83 from its lower part to its front part. The oil guide rib 194 extends further from a front upper edge thereof towards a front upper point, forward of the front upper edge, slantingly, and the guide rib 194 connects a front wall of the left transmission case 72a. By the way, an arrow shown by "K" in FIG. 8, indicates a flow of the oil, and the flow of the oil moving upwards in a region between the front part of the counter shaft 82 and the front part of the input shaft 81 is formed by the chain 93 provided between the input shaft 81 and the counter shaft 82 for backward movement (FIG. 6).

As shown in FIG. 11, the right oil chamber 176 formed on the right side of the counter shaft 82 fluidically communicates with a right oil intake chamber 188 through a right oil intake passage 187 extending upwards and rearward from the right oil chamber 176. The right oil intake passage 187 is formed inside the right transmission case 72b. The right oil intake chamber 188 is formed by a damming plate 190 which is fixed to an inner rib 189 of the right transmission case 72b by a tapping screw 191 (FIG. 7).

As shown in FIG. 7, the right oil intake chamber 188 locates rear of the input shaft 81, and the right oil intake chamber 188 opens upwards inside the transmission case 35. Thereby, oil splashed by the input shaft 81 in rotation is received efficiently by the right oil intake chamber 188. Also, an oil guide rib 193 is formed on an upper opening part of the right oil intake chamber 188, where the rib 193 guides the oil splashed from the input shaft 81 back to the intake chamber 188. By the way, an arrow "K" in FIG. 7 also indicates a flow of the oil around the input, counter and transmission output shafts 81, 82, 83.

As shown in FIG. 7, a breather mechanism 201 for the transmission case locates above the input shaft 81 and locates generally centrally in the width direction of the transmission case 35 as described later in detail. The breather mechanism 201 is formed integrally with the transmission case 35. The breather mechanism 201 has an upper breather chamber 202 and an lower breather chamber 203. An upper wall forming the upper breather chamber 202 has a breather hole 210, to which a breather pipe 212 is connected through a breather joint pipe 211.

Figure 15:
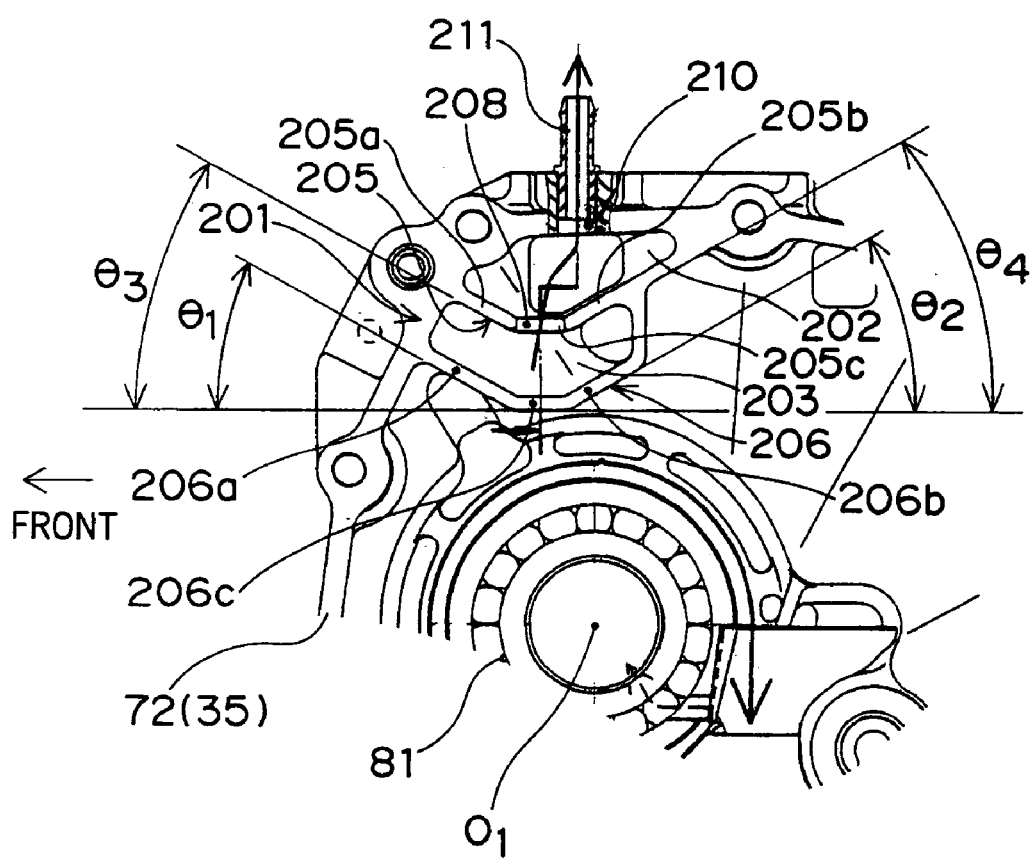
FIG. 15 is an enlarged view of part (i.e. breather mechanism) shown by an arrow XV of FIG. 7.

FIG. 15 is an enlarged cross sectional view of the breather mechanism shown by an arrow XV of FIG. 7. As shown in the figure, each of upper and lower bottom walls 205, 206 forming the upper and lower breather chambers 202, 203, is formed so as to open upwards generally in a V-shape in the back-and-forth direction. The upper bottom wall 205 has a front tilt wall part 205a which tilts upwards towards the front side and a rear tilt wall part 205b which tilts upwards towards the rear side. Similarly, the lower bottom wall 206 has a front tilt wall part 206a which tilts upwards towards the front side and a rear tilt wall part 206b which tilts upwards towards the rear side. In the construction, the inclination angle θ1, θ3 of the front tilt wall parts 205a, 206a with respect to the horizontal plane are set to be 30 degrees, for example, respectively. Similarly, the inclination angle θ2, θ4 of the rear tilt wall parts 205b,206b with respect to the horizontal plane, are also set to be 30 degrees, for example, respectively. The upper bottom wall 205 has a central bottom part 205c locating between the front tilt wall part 205a and the rear tilt wall part 205b, where the central bottom part 205c has a breather passage 208 which penetrates through the central bottom part 205c in the direction of up and down. Also, as shown in FIG. 8, the lower bottom wall 206 also has a central bottom part 206c locating between the front tilt wall part 206a and the rear tilt wall part 206b, where the central bottom part 206c has a breather passage 209 which penetrates through the central bottom part 206c in the direction of up and down.

Figure 16:
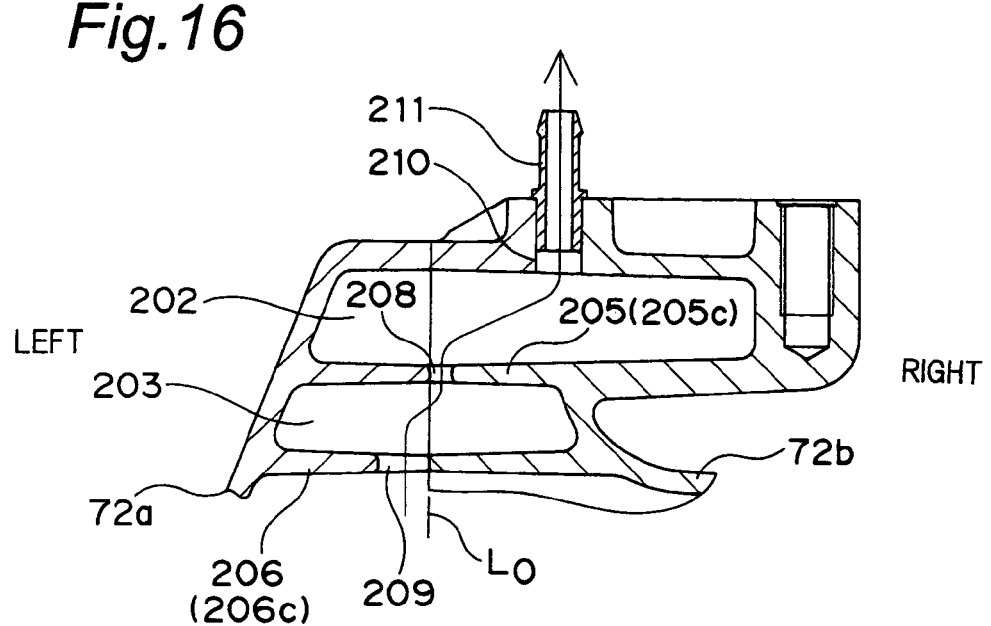
FIG. 16 is an enlarged cross-sectional view taken approximately in a line XVI-XVI of FIG. 7.

FIG. 16 is an enlarged cross-sectional view taken approximately in line XVI-XVI of FIG. 7. As shown in the figure, each of the upper and lower breather chambers 202, 203, is formed so as to extend in the direction of the right and left (i.e. in the width direction) from the mating face LO locating between the right and left transmission cases 72b, 72a. More specifically, the lower breather chamber 203 is formed so as to extend generally symmetrically relative to the mating face LO in the direction of the right and left. Namely, the distance between the left side wall of the lower breather chamber 203 and the mating face LO is generally equal to a distance between the right side wall of the lower breather chamber 203 and the mating face LO. Meanwhile, the upper breather chamber 202 is formed so as to extend asymmetrically relative to the mating face LO in the direction of the right and left, where part of the upper breather chamber 202 existing in the left transmission case 72a is formed shorter than part of the upper breather chamber 202 existing in the right transmission case 72b in the direction of the right and left.

The breather passage 208 formed in the upper bottom wall 205 is positioned offset rightward relative to the mating face LO, and the breather passage 209 formed in the lower bottom wall 206 is positioned offset leftward relative to the mating face LO. The breather hole 210 formed in the upper wall of the upper breather chamber 202, is positioned generally centrally in the direction of the right and left, where the breather hole 210 is positioned offset rightward relative to the breather passage 208 with a predetermined distance.

Figure 17:
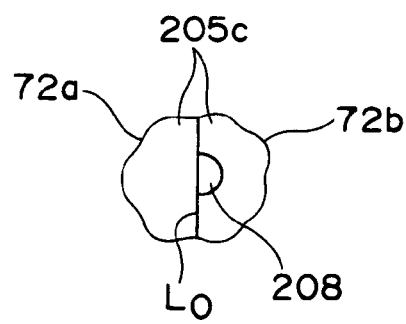
FIG. 17 is a planar view of a breather passage which locates in an upper step shown in FIG. 16.

FIG. 17 is a plan view showing part of the central bottom part 205c having the breather passage 208. As shown in the figure, the breather passage 208 is constructed as a half-round notch formed on the mating face LO of the right transmission case 72b.

Figure 18:
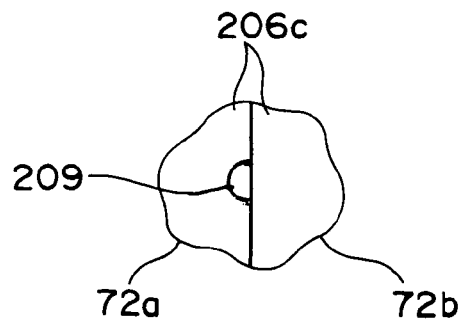
FIG. 18 is a planar view of a breather passage which locates in a lower step shown in FIG. 16.

FIG. 18 is a plan view showing part of the central bottom part 206c having the breather passage 209. As shown in the figure, the breather passage 209 is constructed as a half-round notch formed on the mating face LO of the left transmission case 72a.

As explained, the two breather passages 208, 209 are positioned offset from each other relative to the mating face LO in the direction of the right and left, and the breather hole 210 formed in the upper wall of the upper breather chamber 202 is also positioned offset rightward relative to the breather passage 208 with the predetermined distance to form a mechanism of labyrinth having a plurality of steps.

Returning to FIG. 9, the breather pipe 212 is formed as a reverse U-shaped member. A chamber 213 for preventing water from entering in from outside, which has a predetermined volume, is attached to an outlet end of the pipe 212.

Next, it is explained below about the operation.

When the vehicle is desired to be run with the two-wheel drive, the operation lever 12 (FIG. 1) is shifted towards the two-wheel drive side. Then, the selector lever 109, shown in FIG. 10 is rotated towards the two-wheel drive side. The selector arm 107 is then swung forward around the pivot 158, and the selector sleeve 104 is pushed and moved forward to the two-wheel drive position. The pair of dog claws 105, 106 (see FIG. 6) are then disengaged from each other, and the drive power transmitted from the transmission output shaft 83 to the power takeoff shaft 51 is cut off.

In the running mode by the two-wheel drive, the drive power from the engine 33, is, first, transmitted to the input shaft 81 of the transmission 34 through the belt converter 45 shown in FIG. 2. Then, the drive power is transmitted from the input shaft 81 to the counter shaft 82 through the low-speed gears 85, 90, or through the high-speed gears 86, 91, for forward movement, or through the drive and driven sprockets 87, 92 and the chain 93 for backward movement, as shown in FIG. 6, in accordance with a desired mode (i.e. low gear mode, high gear mode, or reverse travel mode). Then, the drive power is transmitted from the counter shaft 82 to the transmission output shaft 83, through the intermediate output and transmission output shaft drive gears 96, 97. Then, the drive power is transmitted from the transmission output shaft 83 to the right and left rear axle shafts 31 through the output gear 98 of the transmission output shaft 83, the differential input gear 100 inside the rear reduction gear mechanism 36, and the differential gear mechanism 102.

On the other hand, when the vehicle is desired to be run with the four-wheel drive, the operation lever 12 (FIG. 1) is shifted towards the four-wheel drive side. Then, the selector lever 109, shown in FIG. 10, is rotated towards the four-wheel drive side. The selector arm 107 is then swung backward (i.e. rearward) around the pivot 158, and the selector sleeve 104 is pushed and moved backward to the four-wheel drive position. The pair of dog claws 105, 106 (see FIG. 6) are engaged with each other, and the drive power is transmitted from the transmission output shaft 83 to the power takeoff shaft 51.

In the running mode by the four-wheel drive, the drive power from the engine 33, is transmitted to the pair of rear axle shafts 31 in the manner similar to that in the running mode by the two-wheel drive. In addition, the drive power is also transmitted from the transmission output shaft 83 to the power takeoff shaft 51, through the drive bevel gear 99, the driven bevel gear 103 and the selector sleeve 104. Further, the drive power is transmitted from the power takeoff shaft 51 to the pair of front axle shafts 21 through the propeller shaft 52 and the front reduction gear mechanism 20.

Figure 19:
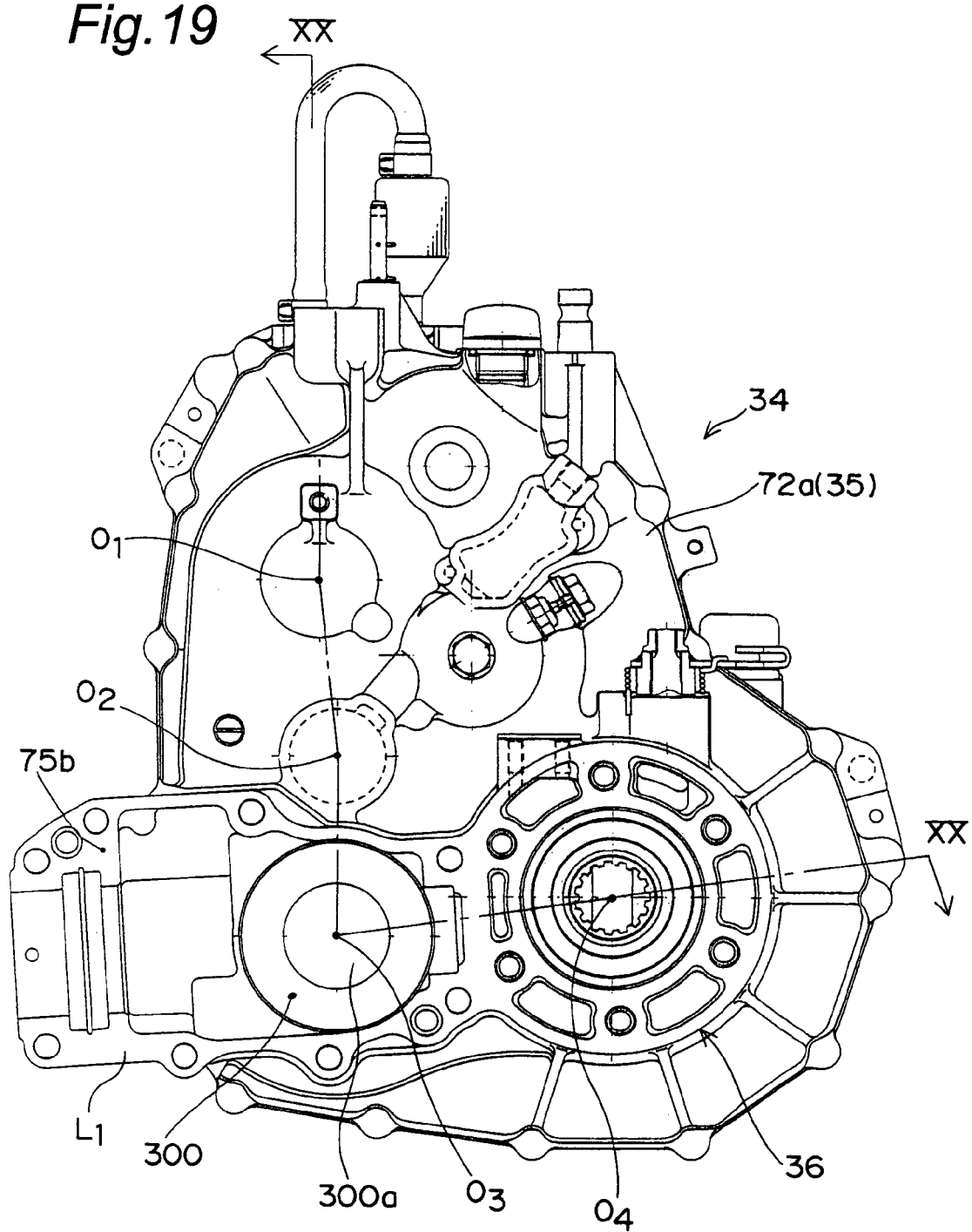
FIG. 19 is a left side view of the transmission according to a modification to the embodiment, which applies to a two-wheel drive vehicle.
Figure 20:
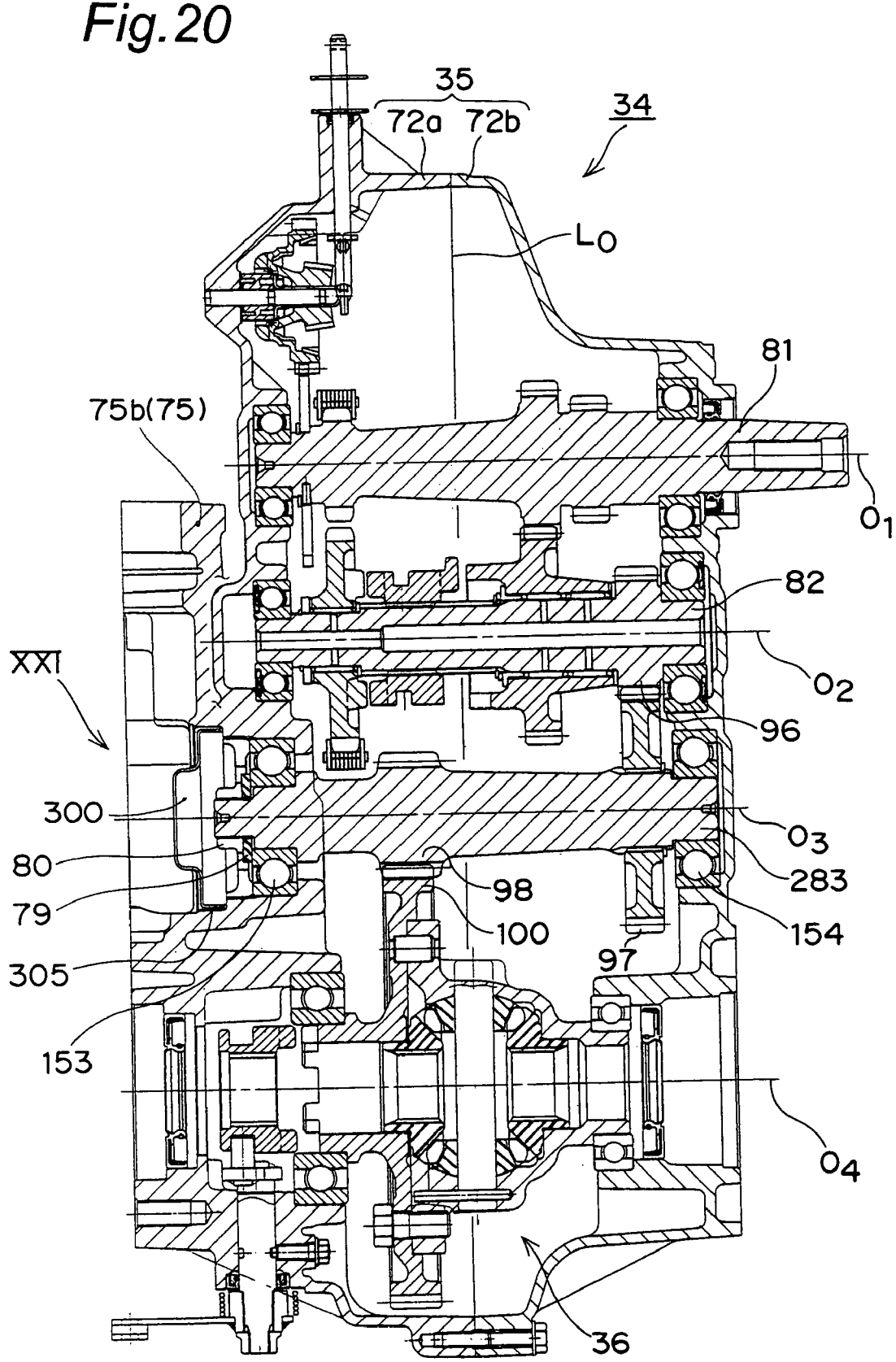
FIG. 20 is a cross-sectional view of the transmission of FIG. 19 which is shown by cutting the same by a plane (XX-XX) passing through each shaft for the transmission.
Figure 21:
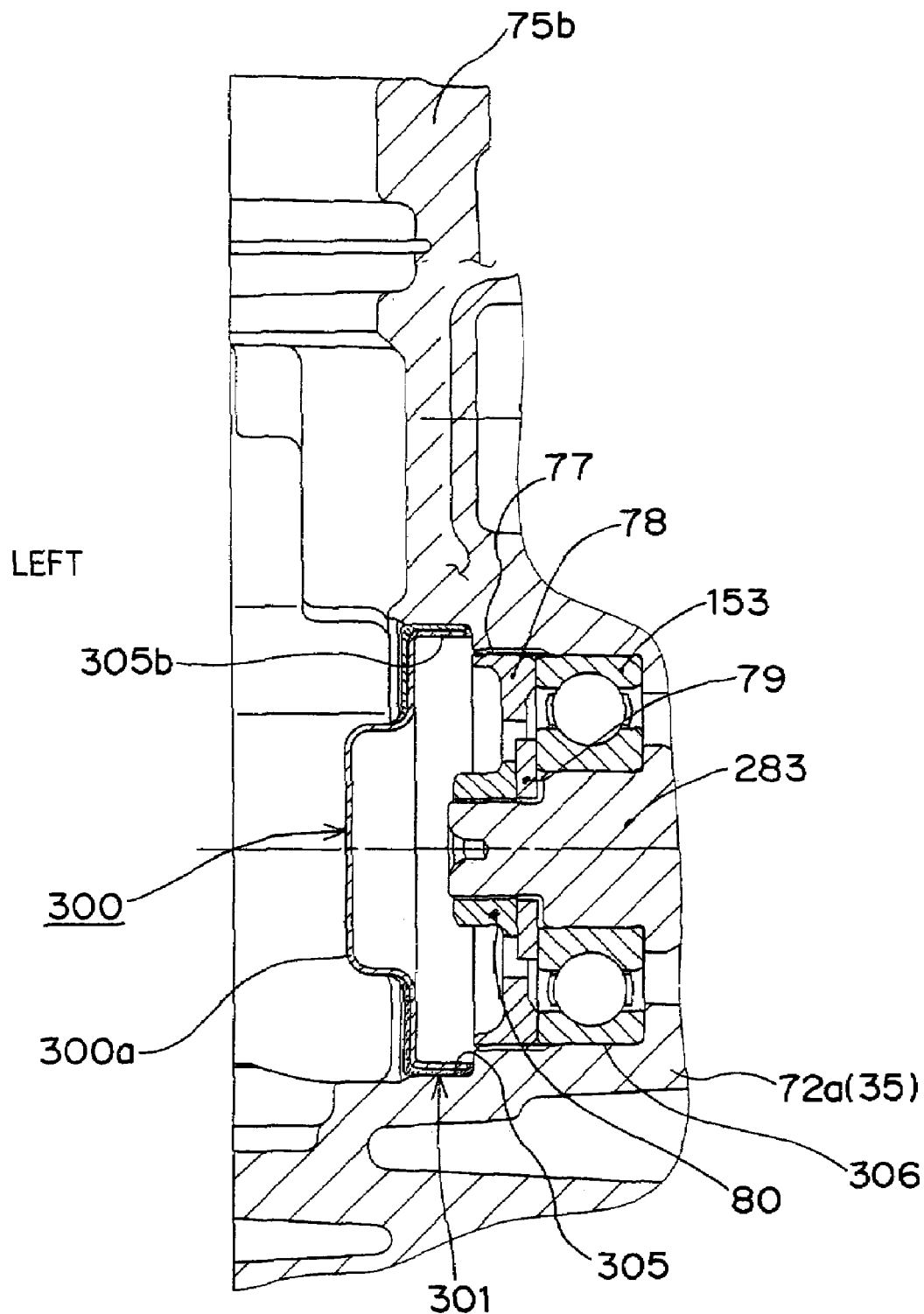
FIG. 21 is an enlarged view of part shown by an arrow XXI of FIG. 20.

Next, with reference to FIGS. 19 through 21, it is explained about the transmission according to the modification of the embodiment, which applies to the two-wheel drive vehicle.

FIG. 6 shows the structure of the transmission 34 having the four-wheel drive and the two-wheel drive. In the construction, it is possible to modify the transmission 34 having the four-wheel and two-wheel drives into the transmission 34 applied only to two-wheel drive vehicle by canceling some parts, or components, for contributing to transmission of the drive power from the engine 33 to the front wheels 22, including the power takeoff shaft 51, the drive bevel gear 99, the driven bevel gear 103, and so on. By the way, in FIGS. 19 through 21, component parts similar to those shown in FIGS. 6 and 9, are indicated by the same reference numerals.

FIG. 20 is a cross-sectional view similar to FIG. 6. Similar to the structure of FIG. 6, the transmission case 35 in FIG. 20 is composed of a pair of right and left transmission cases 72b, 72a which are joined together at the mating face LO locating centrally in the width direction. Different from the embodiment shown in FIG. 6, the left half case part 75a of the power takeoff shaft case 75 is not used and is not fixed to the right half case part 75b of the power takeoff shaft case 75 formed integrally with the left transmission case 72a. Instead, as shown in FIG. 20, a cap 300 is inserted into a hole formed outside (left side) the left ball bearing 153 in the right transmission case 72b. Also, in the modification, the left edge part of a transmission output shaft 283 is cut short so as not to project outside the transmission case 34, such that it is suitable for the two-wheel drive vehicle.

FIG. 21 is an enlarged view of the left edge part of the transmission output shaft 283. An inner race of the left ball bearing 153 is locked on the transmission output shaft 283 by the stuffing nut 80 through the washer 79.

The cap 300 which covers the left edge part of the transmission output shaft 283, is made of steel plate. The cap 300 has a body part and a cylindrical engagement part 305b which projects rightwards from an outer peripheral part of the body part in FIG. 21. Also, the cap 300 has a cylindrical convex part 300a having a bottom, at a central part of the body part, where the part 300a is integrated with the body part and the part 300a projects leftwards in FIG. 21. Further, the cylindrical engagement part 305b is coated with a seal member 301 made of rubber by plating (or baking). The convex part 300a can be used for removal of the cap 300 from the left transmission case 72a, by holding the part 300a with a tool.

FIG. 19 is a left side view of the transmission 34 for the two-wheel drive vehicle. As shown in the figure, the mating face L1 of the power takeoff shaft case 75 used in the embodiment shown in FIG. 6 is exposed outside.

During the drive of the vehicle, the oil housed inside the transmission case 35 shown in FIG. 6, is moved, as shown in the arrow K in FIGS. 7 and 8, by the gears and the like which are provided in the transmission case 35. Part of oil splashed upwards, and/or part of oil splashed from the grand governor 181 shown in FIG. 12, is captured by the left oil intake chamber 179 and by the right oil intake chamber 188, respectively (see FIG. 11). Then, the oil thus captured, passes through the left oil intake passage 177 and the right oil intake passage 187, and the oil is supplied to the oil passage 169 of the counter shaft 82. Then, the oil is supplied to the needle roller bearing 145 of the low-speed gear 90 to the needle roller bearing 146 of the high-speed intermediate gear 91, and to the needle roller bearing 147 of the sprocket 92, respectively.

When the vehicle tilts downwardly to the right side, the location of the left oil intake chamber 179 becomes higher. Under the situation, the amount of oil captured in the left oil intake chamber 179 diminishes. However, at the same time, because the location of the right oil intake chamber 188 becomes lower, the amount of oil captured in the right oil intake chamber 188 increases to the contrary. As a result, enough oil is supplied from the right oil intake chamber 188 to the oil passage 169 of the counter shaft 82.

On the contrary, when the vehicle tilts downwardly to the left side, the location of the right oil intake chamber 188 becomes higher. Under the situation, the amount of oil captured in the right oil intake chamber 188 diminishes. However, at the same time, because the location of the left oil intake chamber 179 becomes lower, the amount of oil captured in the left oil intake chamber 179 increases to the contrary. As a result, enough oil is supplied from the left oil intake chamber 179 to the oil passage 169 of the counter shaft 82.

Namely, even when the vehicle is tilted to the right side or left side, enough oil is supplied to the needle roller bearing on the counter shaft 82.

When the pressure inside the transmission case 35 increases, the air including oil particles, first, enters the lower breather chamber 203 through the breather passage 209 on the lower bottom wall 206 shown in FIG. 16. Thereby, the air-oil mixture is separated into the air and oil, as a first step. Further, the air which still includes the oil particles, enters the upper breather chamber 202 through the breather passage 208 of the upper bottom wall 205, from the lower breather chamber 203. Thereby, the air-oil mixture is again separated into the air and oil, as a second step. Then, the air component (or gaseous component) is discharged outside, through the breather hole 210 shown in FIG. 16, and then through the breather pipe 212 and chamber 213, shown in FIG. 9.

As aforementioned, the breather passage 209 of the lower bottom wall 206, and the breather passage 208 of the upper bottom wall 205, are positioned offset from each other, and further the breather hole 210 is positioned offset from the breather passage 208 of the upper bottom wall 205. With the construction, the air-oil mixture is effectively separated into the air and oil, because the breather mechanism 201 (see FIG. 7) performs the function of labyrinth through the first and second steps.

The oil collected in the upper and lower breather chambers 202, 203, is led to the central bottom part 205c by the front tilt wall part 205a and the rear tilt wall part 205b of the upper breather chamber 202, and is led to the central bottom part 206c by the front tilt wall part 206a and the rear tilt wall part 206b of the lower breather chamber 203, respectively, while the oil is promptly discharged downwardly through the respective breather passages 208, 209.

As shown in FIG. 16, the upper breather chamber 202 is formed long in the width direction, and the breather hole 210 locates generally centrally in the width direction of the upper breather chamber 202. With the construction, when the vehicle turns in either of the right or left direction, the oil corrected in the upper breather chamber 202 is pressed against the inner peripheral wall part of the breather chamber 202 on the basis of its centrifugal force. Accordingly, the oil is hardly discharged through the breather hole 210, as far as the upper breather chamber 202 is not filled with the oil.

According to the above embodiment, each of the front tilt wall part 205a and the rear tilt wall part 205b of the upper bottom wall 205 is tilted at 30 degrees, and each of the front tilt wall part 206a and the rear tilt wall part 206b of the lower bottom wall 206 is tilted at 30 degrees. Therefore, when the vehicle is running continuously with the angle of tilt of the vehicle being less than 30 degrees in the back-and-forth direction, the oil collected inside each of the upper and lower breather chambers 202, 203, is promptly discharged through each of the breather passages 208, 209.

Although the present invention has been fully described in connection with the preferred embodiment thereof with reference to the accompanying drawings, it is to be noted that various other changes and modifications are also apparent to those skilled in the art.

For example, the four-wheel drive vehicle to which the transmission according to the present invention can apply, is not limited to the utility vehicle for transport of articles. Namely, the transmission according to the present invention can apply to the four-wheel vehicle having a swing arm for the rear wheel.

Such changes and modifications are also to be understood as included within the scope of the present invention as defined by the appended claims, unless they depart therefrom.

What is claimed is:

1. A transmission of a four-wheel drive vehicle having a swing arm for supporting rear wheels of the vehicle, the swing arm being supported on a vehicle body so as to be able to swing in an up and down direction, the transmission comprising:
   a transmission case having a power takeoff shaft case;
   an input shaft housed in the transmission case;
   a counter shaft housed in the transmission case, in which the counter shaft is in parallel with the input shaft and is connected with the input shaft through a gear mechanism;
   a transmission output shaft housed in the transmission case, in which the transmission output shaft is in parallel with the counter shaft and is connected with the counter shaft through a gear mechanism;
   a power takeoff shaft for driving front wheels of the vehicle, in which the power takeoff shaft is housed in the power takeoff shaft case and is connected with the transmission output shaft through a bevel gear mechanism, and in which the power takeoff shaft extends in a direction substantially perpendicular to the transmission output shaft;
   a rear reduction gear mechanism housed in the transmission case, in which the rear reduction gear mechanism is connected with the transmission output shaft through a gear mechanism; and
   a rear axle shaft for driving the rear wheels, in which the rear axle shaft is housed in the transmission case and is supported on the transmission case at one end thereof, and in which the rear axle shaft is connected to the rear reduction gear mechanism,
   wherein the transmission is mounted on the swing arm of the vehicle.

2. The transmission as claimed in claim 1, wherein the input shaft, the counter shaft and the transmission output shaft are arranged from top down in this order, and wherein the rear reduction gear mechanism and the rear axle shaft are arranged on a rear side of the transmission output shaft.

3. The transmission as claimed in claim 1, wherein the power takeoff shaft for driving the front wheels, is provided with a drive selector mechanism for changing drive modes between a two-wheel drive and a four-wheel drive, by which a power from the transmission output shaft to the front wheels is on and off.

4. The transmission as claimed in claim 3, wherein the drive selector mechanism has a driven bevel gear constituting the bevel gear mechanism, in which the driven bevel gear is relatively rotatably mounted on the power takeoff shaft, in which the driven bevel gear is provided with a dog claw projecting from a side of the driven bevel gear in an axial direction of the power takeoff shaft, and wherein the drive selector mechanism has a selector sleeve which spline-engages with the power takeoff shaft such that the selector sleeve can slide on the power takeoff shaft in the axial direction, in which the selector sleeve has a dog claw which is opposed to the dog claw of the driven bevel gear and which can engage and disengage with respect to the dog claw of the driven bevel gear, and in which when the selector sleeve is slid on the power takeoff shaft in the axial direction, the dog claw of the selector sleeve is engaged and disengaged with respect to the dog claw of the driven bevel gear, thus changing the drive modes between the two-wheel drive and the four-wheel drive.

5. The transmission as claimed in claim 1, wherein the power takeoff shaft case is composed of a pair of half case parts which are divided by a mating face passing through an axis of the power takeoff shaft, in which one of the half case parts is integrally formed with the transmission case.

* * * * *